United States Patent
Gotoh et al.

(10) Patent No.: US 7,502,150 B2
(45) Date of Patent: Mar. 10, 2009

(54) COLOR CONVERTING DEVICE, IMAGE FORMING APPARATUS, COLOR CONVERSION METHOD, COMPUTER PROGRAM AND RECORDING MEDIUM

(75) Inventors: Makio Gotoh, Nara (JP); Gaku Furuichi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 589 days.

(21) Appl. No.: 11/137,341

(22) Filed: May 26, 2005

(65) Prior Publication Data
US 2005/0264836 A1 Dec. 1, 2005

(30) Foreign Application Priority Data
May 28, 2004 (JP) .............................. 2004-160043
Feb. 24, 2005 (JP) .............................. 2005-049545

(51) Int. Cl.
*H04N 1/46* (2006.01)
*H04N 1/60* (2006.01)
*G03F 3/08* (2006.01)
*G06F 15/00* (2006.01)
*G06K 1/00* (2006.01)
*G06K 9/00* (2006.01)

(52) U.S. Cl. ........................ 358/525; 358/523; 358/518; 358/1.9; 382/162; 382/167

(58) Field of Classification Search .................. 358/1.9, 358/518, 523, 525; 382/162, 167
See application file for complete search history.

(56) References Cited

U.S. PATENT DOCUMENTS
5,883,821 A * 3/1999 Komaki ...................... 708/290
(Continued)

FOREIGN PATENT DOCUMENTS
JP 7-184073 A 7/1995
(Continued)

OTHER PUBLICATIONS
Shogo Oneda, "Color Reproduction Method for Electrophotographic Printer" The Journal of Imaging Society of Japan vol. 37 No. 4, 1998 p. 555-559.
(Continued)

*Primary Examiner*—Mark K Zimmerman
*Assistant Examiner*—Fan Zhang
(74) *Attorney, Agent, or Firm*—Birch, Stewart, Kolasch & Birch, LLP

(57) ABSTRACT

In a color converting device for converting input image data based on a plurality of first color components (the number of bits of each color component is k) into output image data based on plural of second color components by interpolation processing using a 3DLUT storing color correction values at grid points obtained by dividing a color space composed of the plurality of first color components, the distance of the grid points is $2^n$ (where n is an integer smaller than k), the number Dn of grid points of the plurality of first color components is an integer satisfying $2^{m-1}+1<Dn<2^{m+1}+1$ (where $Dn \neq 2^m+1$, and m=k−n), and input image data is converted into output image data by converting each color component data of the input image data according to the number of grid points, and performing interpolation processing by reading color correction values corresponding to the converted color components from the 3DLUT.

7 Claims, 23 Drawing Sheets

U.S. PATENT DOCUMENTS

| | | | |
|---|---|---|---|
| 5,914,744 A * | 6/1999 | Ng | 347/237 |
| 6,788,432 B1 * | 9/2004 | Garcia et al. | 358/1.9 |
| 2002/0044150 A1 * | 4/2002 | Sato et al. | 345/600 |
| 2002/0154326 A1 * | 10/2002 | Tsuchiya et al. | 358/1.9 |
| 2003/0067633 A1 * | 4/2003 | Ota | 358/3.03 |

FOREIGN PATENT DOCUMENTS

| | | |
|---|---|---|
| JP | 8-138030 A | 5/1996 |
| JP | 10-191090 A | 7/1998 |
| JP | 2874660 B2 | 1/1999 |
| JP | 2001-8044 A | 1/2001 |
| JP | 2002-218232 A | 8/2002 |

OTHER PUBLICATIONS

"Color Science Handbook, New Edition" The Color Association of Japan, University of Tokyo Press Jun. 1998 p. 1137-1149.

* cited by examiner

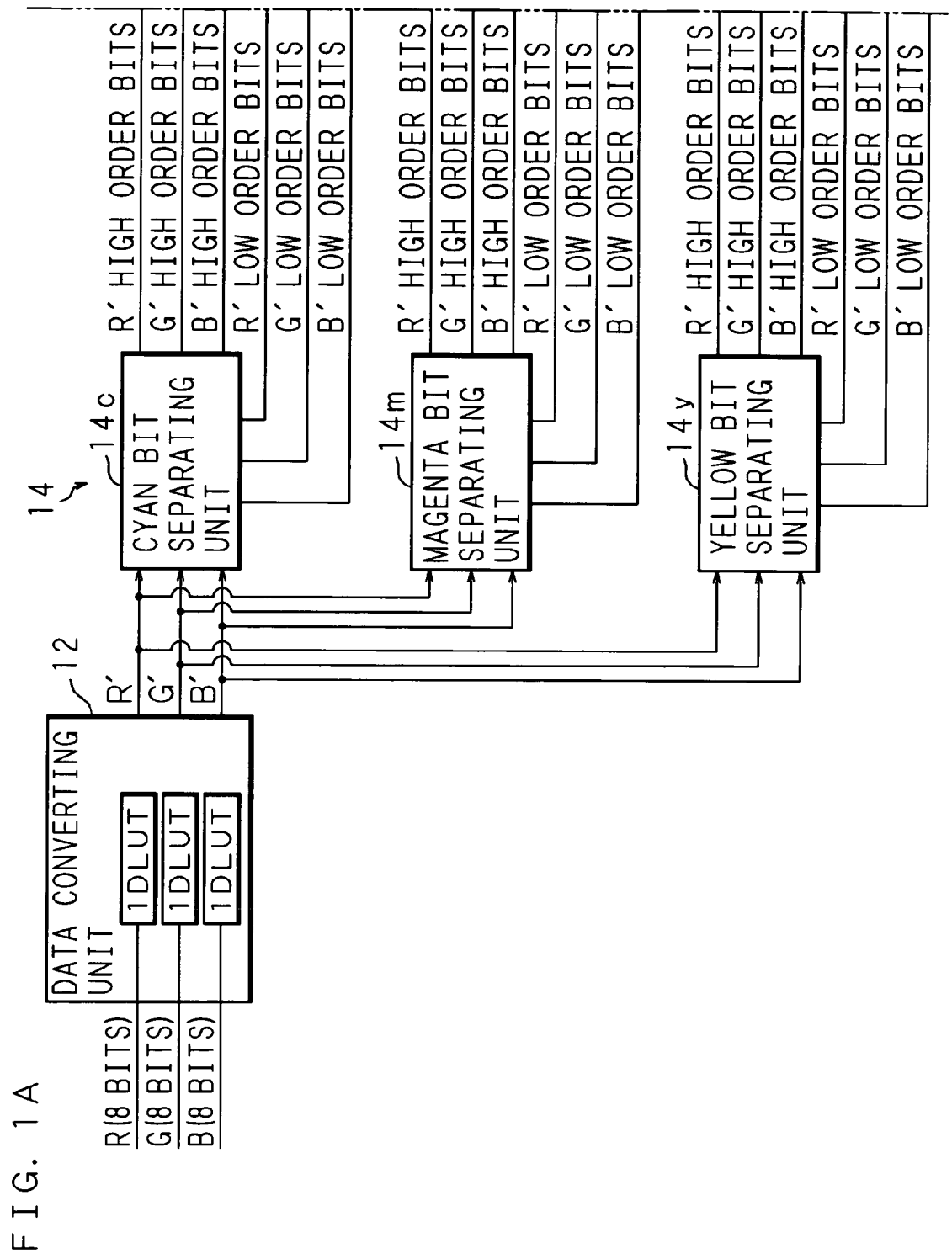

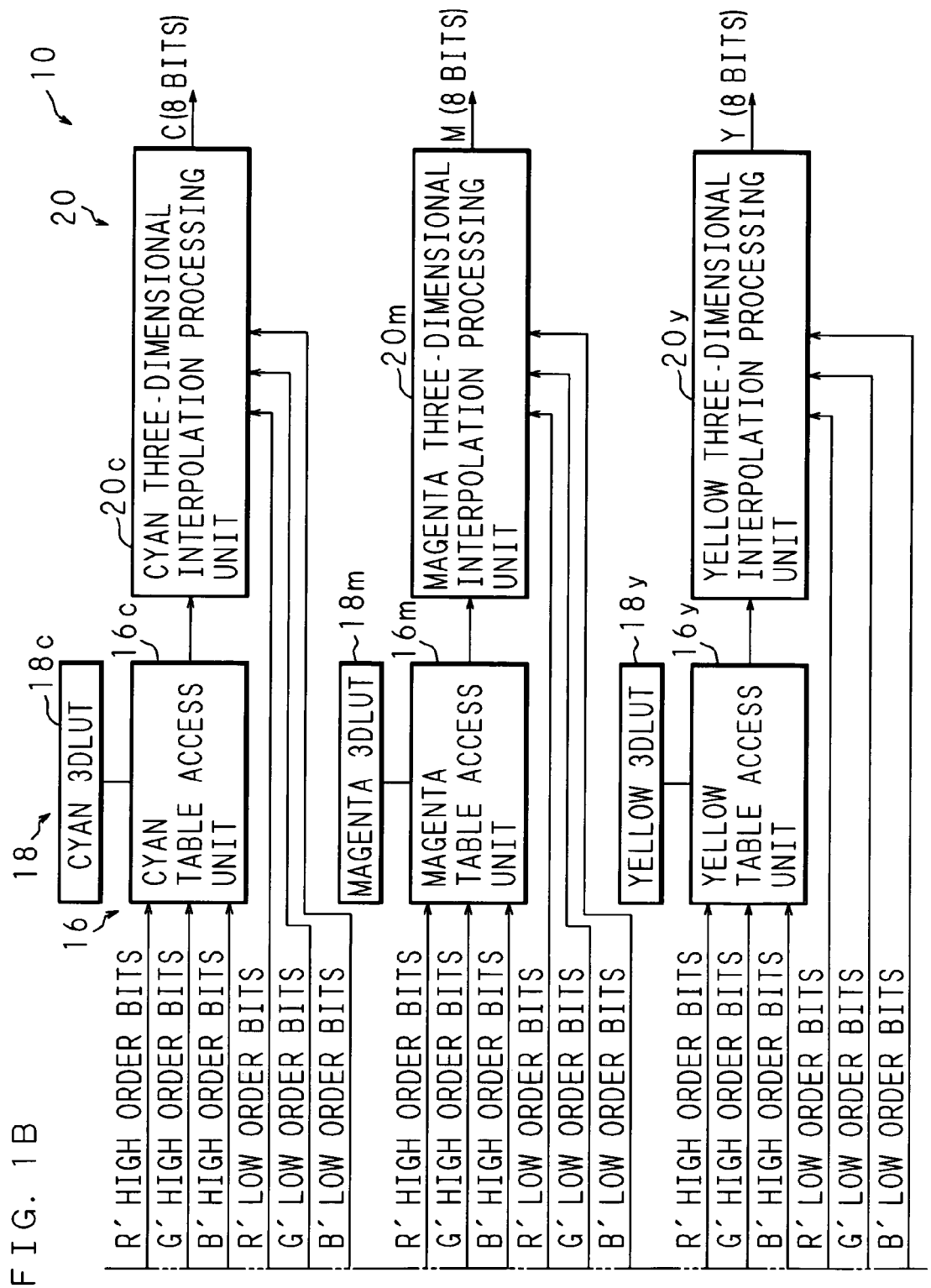

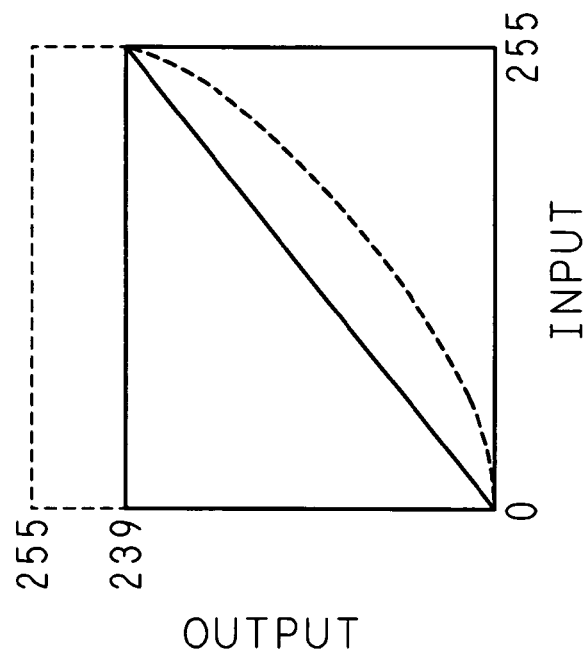
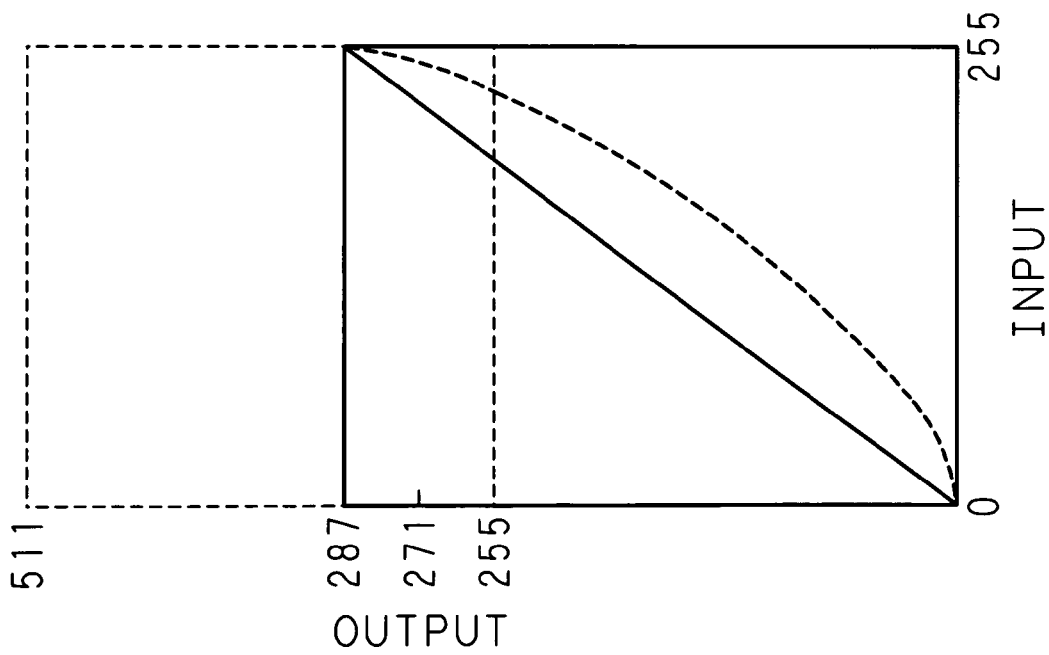
FIG. 2A
FIG. 2B

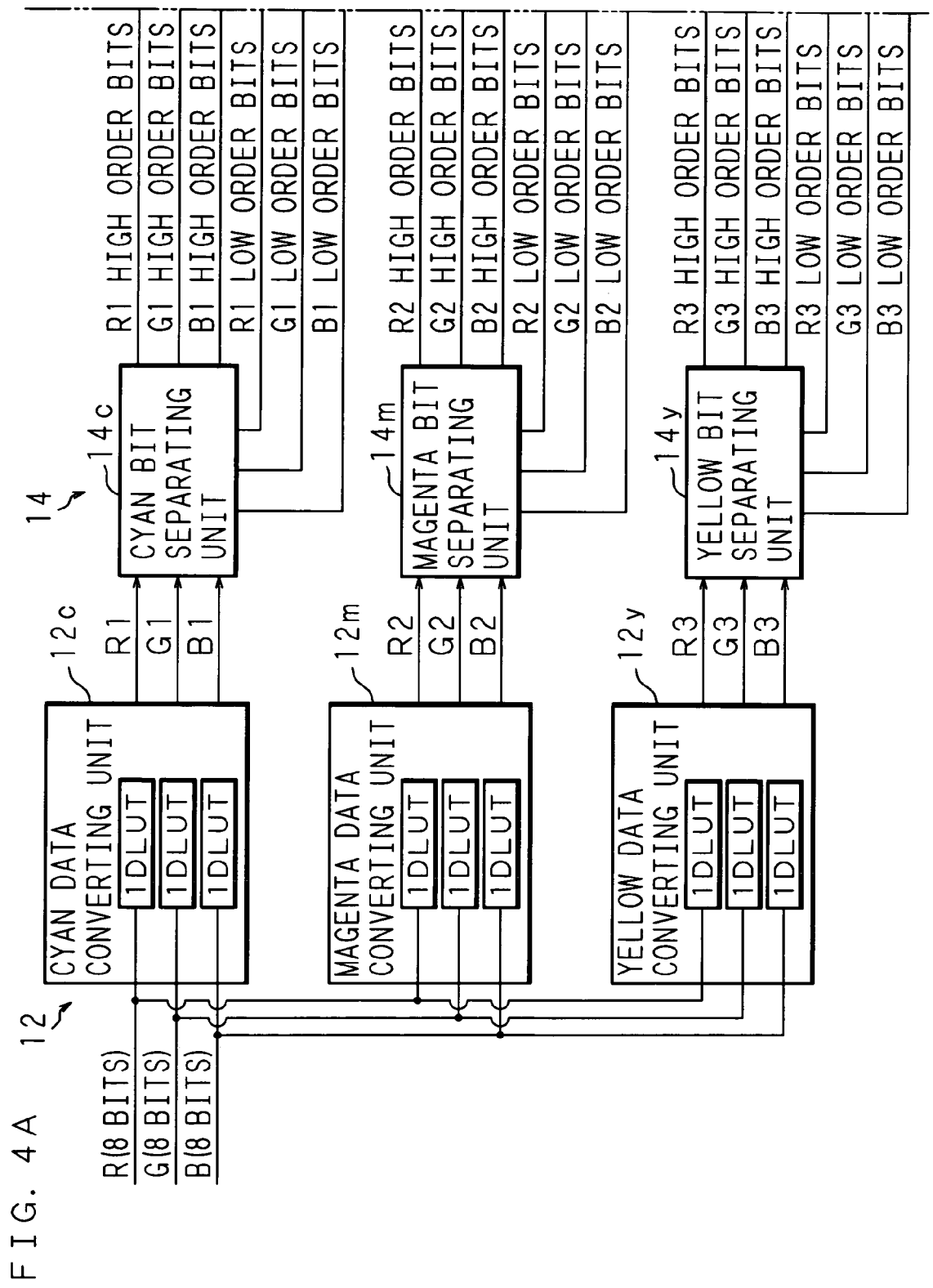

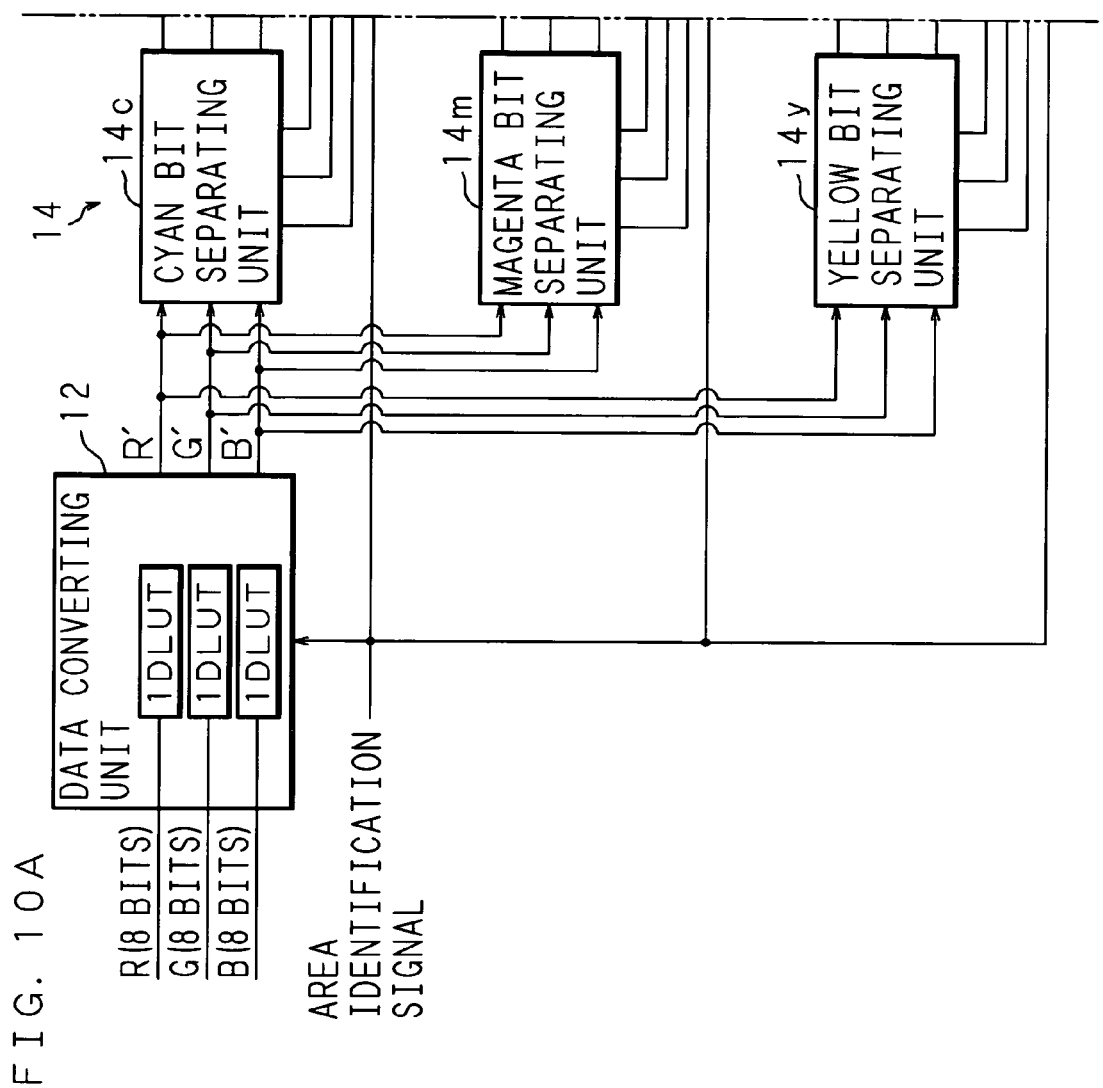

COLOR CONVERTING DEVICE, IMAGE FORMING APPARATUS, COLOR CONVERSION METHOD, COMPUTER PROGRAM AND RECORDING MEDIUM

CROSS-REFERENCE TO RELATED APPLICATIONS

This non-provisional application claims priority under 35 U.S.C. §119(a) on Patent Application No. 2004-160043 filed in Japan on May 28, 2004 and Patent Application No. 2005-49545 filed in Japan on Feb. 24, 2005, the entire contents of which are hereby incorporated by reference.

BACKGROUND OF THE INVENTION

1. Field of the Invention

The present invention relates to a color converting device and a color conversion method for converting input image data based on a plurality of first color components into output image data based on a plurality of second color components, an image forming apparatus comprising the color converting device, a computer program for causing a computer to convert input image data based on a plurality of first color components into output image data based on a plurality of second color components, and a recording medium storing the computer program.

2. Description of Related Art

In recent years, there is rapid development of digital OA apparatuses and there is an increasing demand for color image output, and electrophotographic type digital color copying machines, ink-jet type color printers, thermal transfer type color printers, etc. have been widely spread in general. For example, image data such as image data inputted using input devices such as a digital camera or a scanner, or image data created on a computer, are outputted using these output devices. These input and output devices are required to always output images with stable color reproduction with respect to input image data, and the color conversion (color correction) process of digital image processing techniques performs an important role.

As a color conversion method, a number of methods were conventionally proposed, such as a color coordinate conversion method for converting input image data into uniform color space data. Examples of such a method include methods using a lookup table (hereinafter referred to as a LUT) disclosed in Color Science Handbook, New Edition, p. 1137-1149 (The Color Science Association of Japan, University of Tokyo Press), and the Journal of Imaging Society of Japan, Vol. 37, No. 4 (1998), p. 555-559. The process of correcting color signals (color components) that become inappropriate output if not corrected, the process of converting color signals to change the color itself, and the process of converting the coordinate system of color signals without changing the color itself will all be hereinafter called color conversion.

A direct conversion method as one of the LUT methods is a method in which color conversion data are calculated for all combinations of input image data in advance, the results are stored in a color conversion table, and table values (color correction values) corresponding to input image data are referred and outputted as output image data. In the direct conversion method, since an access is made to the color conversion table, the circuit structure is simple and it is possible to perform relatively high-speed processing, and therefore this method can be applied irrespective of any non-linear characteristics.

In a three-dimensional interpolation method that is another LUT method, color correction values for part of input image data are calculated and stored in a color conversion table in advance, and input image data in the vicinity of input image data whose color correction values are stored in the color conversion table are calculated by linear interpolation processing using the color correction values stored in the color conversion table. With this three-dimensional interpolation method, even when the number of pieces of input image data for which color correction values should be calculated in advance is limited, it is possible to perform color conversion for every combination of input image data, and it is possible to decrease the data size of the color conversion table compared with the direct conversion method.

FIG. 9 is a view showing an outline of the three-dimensional interpolation method. In the example shown in FIG. 9, the width (hereinafter referred to as a grid width) of a color space composed of 8-bit R (red), G (green), and B (blue) is divided by 16, and color correction values at grid points (0, 16, 32, ..., 240, 256) including both end points 0 and 256 are stored in a color conversion table. In this case, for input image data in the vicinity of the grid points, calculation is performed by linear interpolation processing using the color correction values stored in the color conversion table.

However, since the three-dimensional interpolation method is often a linear interpolation method, if the relationship between input and output is non-linear, it suffers from a problem of large interpolation errors. Moreover, if an attempt is made to increase the accuracy of color conversion, there arises a problem that the memory capacity of a LUT, etc. for storing the color conversion table increases.

In order to solve these problems, a method was proposed in which values Ui of grid points are determined without using theoretical values so that the sum of errors in the entire space is minimum, and the grid width of the input space is adjusted so that the output space is equally divided (see, for example, Japanese Patent Application Laid Open No. 7-184073 (1995)). With this method, it will be possible to improve the interpolation accuracy by appropriately determining the values of grid points.

In another proposed method, in a color space in which one component among R, G, and B components is more finely divided than the other components, a plurality of color conversion tables having CMY values corresponding to each point are provided (see, for example, Japanese Patent No. 2874660). With this method, it will be possible to limit the increase of the memory capacity, and particularly it will be possible to improve the color reproducibility of a presentation document etc. in which a wide range where defects of color reproducibility in a printed result will be noticeable is painted over with a single color. Further, this method can limit the increase of the table size (memory capacity) compared with the method of improving accuracy by merely dividing all components finely.

However, in the method disclosed in Japanese Patent Application Laid Open No. 7-184073 (1995), since the grid widths are not uniform, it is necessary to perform a different division process according to a grid width, and the division process cannot be realized by only bit shifting. Thus, there are problems that the circuit becomes larger in scale and complicated, and the processing speed becomes lower. In addition, although some improvement of accuracy is expected by uneven grid widths, there is a problem that the number of grid points must be increased twice for a further improvement of accuracy. For instance, the number of grid points will be increased by about 8 times from 17×17×17=4913 to 33×33×33=35937.

Besides, the method disclosed in Japanese Patent No. 2874660 has the problem that it can only reduce the memory capacity which was increased by about 8 times when all components are divided twice finely to about 6 times. For example, it is only possible to reduce the increase of the memory capacity to about 6 times, 17×17×33×3=28611, from 17×17×17=4913. Further, since there is data redundancy between a plurality of tables, there is a problem that the memory is not used effectively.

BRIEF SUMMARY OF THE INVENTION

The present invention has been made with the aim of solving the above problems, and it is an object of the present invention to provide a color converting device, an image forming apparatus, a color conversion method, a computer program and a recording medium, capable of adjusting the number of grid points according to a memory capacity limit of an LUT or the like stored in a storage unit by arranging the number Dn of grid points to be an integer satisfying $2^{m-1}+1<Dn<2^{m+1}+1$ (where $Dn \neq 2^m+1$, m=k−n, k=the number of bits of each color component of input image data).

Another object of the present invention is to provide a color converting device capable of efficiently using a memory such as a LUT stored in a storage unit by converting a color component of input image data into a color component whose maximum value is represented by (the distance of the grid points×(the number of grid points−1)−1).

Another object of the present invention is to provide a color converting device capable of improving color conversion accuracy, without causing almost no increase in the scale of a circuit, by converting a color component of input image data into a color component of (k+1) bits when the number of bits of each color component of input image data is k bits, the distance of the grid points is $2^n$, and the number of grid points is greater than $2^m+1$ (m=k−n).

Another object of the present invention is to provide a color converting device capable of performing color conversion using a circuit similar to that used when conversion is not performed by converting a color component of input image data into a color component of k bits when the number of bits of each color component of input image data is k bits, the distance of the grid points is $2^n$, and the number of grid points is smaller than $2^m+1$ (m=k−n).

Another object of the present invention is to provide a color converting device capable of adjusting the number of grid points of each color component, according to a memory capacity limit of an LUT or the like stored in a storage unit, by setting the number of grid points for each color component.

Another object of the present invention is to provide a color converting device capable of simplifying the structure of a processing unit for calculating neighboring grid points of the color components of input image data by making the distance of the grid points (grid width) uniform, and capable of achieving an increase in the speed and a reduction in the cost and size.

Another object of the present invention is to provide a color converting device, an image forming apparatus, a color conversion method, a computer program and a recording medium, capable of further simplifying the structure of a processing unit for calculating neighboring grid points of the color components of input image data by arranging the distance of the grid points to be $2^n$ (n is an integer smaller than k), and capable of achieving a further increase in the speed and a further reduction in the cost and size.

Another object of the present invention is to provide a color converting device, a color conversion method, a computer program and a recording medium, capable of adjusting the number of grid points for each type of an image based on input image data, according to a memory capacity limit of an LUT or the like stored in a storage unit, by setting the number of grid points for each type of an image based on input image data.

Another object of the present invention is to provide a color converting device in which a type of an image based on input image data is a type of an image based on an area of pixels to be converted among all pixel areas of the image, and thereby capable of performing color conversion using color correction values suitable for a type of a portion to be converted in an image based on the input image data.

Another object of the present invention is to provide a color converting device in which a type of an image based on input image data is a type of an image based on all pixel areas of the image, and thereby capable of performing color conversion using color correction values suitable for a type of a whole image based on the input image data.

A color converting device according to the present invention is a color converting device for converting input image data based on a plurality of first color components into output image data based on a plurality of second color components by performing interpolation processing using color correction values read from a storage unit storing color correction values at grid points obtained by dividing a color space composed of the plurality of first color components, and characterized by comprising a data converting unit for converting each color component of input image data, according to the number of grid points, wherein the distance of the grid points is uniform, the number of grid points is determined for each color component, and the input image data is converted into output image data by reading color correction values corresponding to the color components converted by the data converting unit from the storage unit and performing interpolation processing using the read color correction values.

A color converting device according to the present invention is a color converting device for converting input image data based on a plurality of first color components into output image data based on a plurality of second color components by performing interpolation processing using color correction values read from a storage unit storing color correction values at grid points obtained by dividing a color space composed of the plurality of first color components, and characterized by comprising a data converting unit for converting each color component of input image data, according to the number of grid points, wherein the distance of the grid points is $2^n$ (where n is an integer smaller than the number k of bits of each color component of the input image data), the number Dn of grid points is an integer satisfying $2^{m-1}+1<Dn<2^m+1$, or $2^m+1<Dn<2^{m+1}+1$ (where m=k−n), and the input image data is converted into output image data by reading color correction values corresponding to the color components converted by the data converting unit from the storage unit and performing interpolation processing using the read color correction values.

A color converting device according to the present invention is characterized in that the data converting unit converts a color component of input image data into a color component whose maximum value is represented by (the distance of the grid points×(the number of grid points−1)−1).

A color converting device according to the present invention is characterized in that when the number of grid points is greater than $2^m+1$ (m=k−n), the data converting unit converts a color component of input image data into a color component of (k+1) bits.

A color converting device according to the present invention is characterized in that when the number of grid points is smaller than $2^m+1$ (m=k−n), the data converting unit converts a color component of input image data into a color component of k bits.

A color converting device according to the present invention is characterized in that the number of grid points of at least one color component of the first color components differs from the number of grid points of the other color components.

A color converting device according to the present invention is a color converting device for converting input image data based on a plurality of first color components into output image data based on a plurality of second color components by performing interpolation processing using color correction values read from a storage unit storing color correction values at grid points obtained by dividing a color space composed of the plurality of first color components, and characterized by comprising a data converting unit for converting each color component of input image data, according to the number of grid points corresponding to a type of an image based on the input image data, wherein the distance of the grid points is uniform, the number of grid points is determined for each type of an image based on input image data, color correction values corresponding to respective types are stored in the storage unit, and the input image data is converted into output image data by reading color correction values corresponding to the color components converted by the data converting unit and a type of an image based on the input image data from the storage unit and performing interpolation processing using the read color correction values.

A color converting device according to the present invention is characterized in that a type of an image based on the input image data is a type of an image based on an area of pixels to be converted among all pixel areas of the image.

A color converting device according to the present invention is characterized in that a type of an image based on the input image data is a type of an image based on all pixel areas of the image.

A color converting device according to the present invention is characterized in that a type of an image based on the input image data includes a type of an image based on all pixel areas of the image, and a type of an image based on an area of pixels to be converted among all pixel areas of various types of images.

A color converting device according to the present invention is characterized in that the number of grid points is further determined for each color component, the data converting unit converts each color component of input image data, according to a type of an image based on the input image data and the number of grid points corresponding to the color component, and the input image data is converted into output image data by reading color correction values corresponding to the color components converted by the data converting unit and a type of an image based on the input image data from the storage unit and performing interpolation processing using the read color correction values.

An image forming apparatus according to the present invention is characterized by comprising: the above-described color converting device; and image forming means for forming an image on a sheet based on image data on which color conversion was performed by the color converting device.

A color conversion method according to the present invention is a color conversion method for converting input image data based on a plurality of first color components into output image data based on a plurality of second color components by performing interpolation processing using color correction values read from a storage unit storing color correction values at grid points obtained by dividing a color space composed of the plurality of first color components, and characterized by comprising the steps of converting each color component of input image data, according to the number of grid points; and converting the input image data into output image data by reading color correction values corresponding to the converted color components from the storage unit and performing interpolation processing using the read color correction values, wherein a distance of the grid points is $2^n$ (where n is an integer smaller than the number k of bits of each color component of the input image data), and the number Dn of grid points is an integer satisfying $2^{m-1}+1<Dn<2^m+1$, or $2^m+1<Dn<2^{m+1}+1$ (where m=k−n).

A color conversion method according to the present invention is a color conversion method for converting input image data based on a plurality of first color components into output image data based on a plurality of second color components by performing interpolation processing using color correction values read from a storage unit storing color correction values at grid points obtained by dividing a color space composed of the plurality of first color components, and characterized by comprising the steps of converting each color component of input image data, according to the number of grid points corresponding to a type of an image based on the input image data; and converting the input image data into output image data by reading color correction values corresponding to the converted color components and a type of an image based on the input image data from the storage unit and performing interpolation processing using the read color correction values, wherein a distance of the grid points is uniform, the number of grid points is determined for each type of an image based on input image data, and the color correction values corresponding to types of images are stored in the storage unit.

A computer program according to the present invention is a computer program for causing a computer to convert input image data based on a plurality of first color components into output image data based on a plurality of second color components by performing interpolation processing using color correction values read from a storage unit storing color correction values at grid points obtained by dividing a color space composed of the plurality of first color components, and characterized by comprising the steps of causing a computer to convert each color component of input image data, according to the number of grid points; and causing the computer to convert the input image data into output image data by reading color correction values corresponding to the converted color components from the storage unit and performing interpolation processing using the read color correction values, wherein a distance of the grid points is $2^n$ (where n is an integer smaller than the number k of bits of each color component of the input image data), and the number Dn of grid points is an integer satisfying $2^{m-1}+1<Dn<2^m+1$, or $2^m+1<Dn<2^{m+1}+1$ (where m=k−n).

A computer program according to the present invention is a computer program for causing a computer to convert input image data based on a plurality of first color components into output image data based on a plurality of second color components by performing interpolation processing using color correction values read from a storage unit storing color correction values at grid points obtained by dividing a color space composed of the plurality of first color components, and characterized by comprising the steps of causing a computer to convert each color component of input image data, according to the number of grid points corresponding to a type of an image based on the input image data; and causing the computer to convert the input image data into output image data by reading color correction values corresponding to the converted color components and a type of an image based on the input image data from the storage unit and performing interpolation processing using the read color correction values, wherein a distance of the grid points is uniform, and the number of grid points is determined for each type of an image based on input image data.

A recording medium according to the present invention is characterized by storing the computer program.

In the present invention, since the distance of the grid points is uniform for all color components, when calculating neighboring grid points of the color components of input image data, the respective color components are divided by the same number. It is therefore possible to calculate the grid points by using the same processing circuit. Moreover, since the number of grid points is determined for each color component, for example, the number of grid points of one color component is increased or decreased based on that of other color component as a standard, conversion of a color component of input image data is performed according to the increase or decrease in the number of grid points. For example, when the R, G and B color components of input image data are between 0 and 255, the distance of the grid points is 16 and the number of grid points of each of R, G and B in the lookup table stored in the storage unit is 17 (the range of the color component is between 0 and 256), 16 (the range of the color component is decreased to 0 and 240), and 18 (the range of the color component is increased to 0 and 272), respectively, conversion of color components of the input image data is performed for G and B for which the number of grid points is increased or decreased based on R as a standard. When the number of grid points is increased, the conversion accuracy is improved, but the memory capacity of the lookup table increases. On the other hand, when the number of grid points is decreased, the conversion accuracy is lowered, but the memory capacity of the lookup table decreases.

In the present invention, since the distance of the grid points is $2^n$ (where n is an integer smaller than the number k of bits of each color component of the input image data), when calculating neighboring grid points of the color components of the input image data, the respective color components are divided by $2^n$. It is therefore possible to calculate the grid points by bit shifting. Moreover, the number Dn of grid points is an integer satisfying $2^{m-1}+1<Dn<2^m+1$, or $2^m+1<Dn<2^{m+1}+1$ (where m=k−n), and conversion of color components of input image data is performed according to the number of grid points. For example, when the R, G and B color components of input image data are between 0 and 255, the distance of the grid points is 16 (n=4) and the number of grid points of each of R, G and B in the lookup table stored in the storage unit is 18 (the range of the color component is increased to 0 and 272), conversion of the R, G and B color components of the input image data is performed according to the number of grid points increased based on the number of divisions 17 ($=2^{8-4}+1$) as a standard. It is possible to finely set the number of grid points to, for example, $(2^m+1)\pm1$, $(2^m+1)\pm2$, or $(2^m+1)\pm3$. When the number of grid points is increased, the conversion accuracy is improved, but the memory capacity of the lookup table increases. On the other hand, when the number of grid points is decreased, the conversion accuracy is lowered, but the memory capacity of the lookup table decreases.

In the present invention, since a color component of input image data is converted into a color component whose maximum value is represented by (the distance of the grid points× (the number of grid points−1)−1), it is possible to associate the color components of the input image data with various lookup tables of different sizes. Consequently, it is possible to flexibly set the lookup tables and efficiently use the memory capacity of the storage unit.

In the present invention, when the number of bits of each color component of input image data is k bits, the distance of the grid points is $2^n$ and the number of grid points is greater than $2^m+1$ (m=k−n), a color component of the input image data is converted into a color component of (k+1) bits. Therefore, since the number of bits after conversion is just increased by one, it is possible to perform color conversion using a circuit almost similar to that used when not converting the color components.

In the present invention, when the number of bits of each color component of input image data is k bits, the distance of the grid points is $2^n$ and the number of grid points is smaller than $2^m+1$ (m=k−n), a color component of the input image data is converted into a color component of k bits. Therefore, since the number k of bits after conversion is the same as that before conversion, it is possible to perform color conversion using a circuit similar to that used when not converting the color components.

In the present invention, the number of grid points of at least one color component is made different from the number of grid points of the other color component, for example, the number of grid points of each of R, G and B components in the lookup table stored in the storage unit is $(2^m+1)$, $(2^m+1)+1$, and $(2^m+1)-1$, respectively. For a color component with an increased number of grid points, the conversion accuracy is improved, but the memory capacity of the lookup table increases. On the other hand, for a color component with a decreased number of grid points, the conversion accuracy is lowered, but the memory capacity of the lookup table decreases. Further, it may also be possible to increase the number of grid points of one color component and decrease the number of grid points of other color component while keeping the same memory capacity of the lookup table.

In the present invention, since the distance of the grid points is uniform, when calculating neighboring grid points of the color components of input image data, the respective color components are divided by the same number. It is therefore possible to calculate the grid points by using the same processing circuit for the whole input image data. Moreover, since the number of grid points is set for each type of an image based on input image data, the color components of input image data are converted according to an increase or decrease of the respective number of grid points based on the standard number of grid points. For example, when the number of grid points in each of lookup tables A, B and C corresponding to types A, B and C of images based on input image data is 17, 16 and 18, respectively, and 17 is the standard number of grid points, conversion of the color components of the input image data is performed for the lookup tables B and C in which the number of grid points is decreased or increased based on the lookup table A as a standard. When the number of grid points is increased, the conversion accuracy is improved, but the memory capacity of the lookup table increases. On the other hand, when the number of grid points is decreased, the conversion accuracy is lowered, but the memory capacity of the lookup table decreases. Further, for each type of an image based on input image data, it may also be possible to set the number of grid points for each color component by setting, for example, the number of grid points of each of R, G and B color components in the lookup table A to 17, 19, and 17, respectively.

In the present invention, a type of an image based on the input image data is a type of an image based on an area of pixels to be converted among all pixel areas, such as, for example, a character area, a photograph area or a dot area, it is possible to perform color conversion using color correction values corresponding to the area of a pixel to be converted, such as a character area or a photograph area in a character-and-photograph image read by an image scanner, for example. Moreover, as described above, by setting the number of grid points for each type of an image based on input image data, it is possible to decrease the number of grid points in a lookup table corresponding to a character area where the number of gray levels is small and increase the number of grid points in a lookup table corresponding to a photograph area where the number of gray levels is large, for example. In this case, it is possible to improve the color conversion accuracy in a photograph area where the number of gray levels is large by lowering the color conversion accuracy in a character area where the number of gray levels is small to a degree causing no problems within a memory capacity limit.

In the present invention, a type of an image based on input image data is a type of an image based on all pixel areas such as, for example, a character image, a photograph image or a character-and-photograph image, it is possible to perform color conversion using color correction values corresponding to a type of a whole image such as, for example, a photograph image read by an image scanner, or a character image received from a computer. Moreover, as described above, by setting the number of grid points for each lookup table corresponding to a type of an image based on input image data, it is possible, for example, to decrease the number of grid points in a lookup table corresponding to a character image in which the number of gray levels is small and increase the number of grid points in a lookup table corresponding to a photograph image in which the number of gray levels is large based on the number of grid points in a lookup table corresponding to a character-and-photograph image. In this case, it is possible to improve the color conversion accuracy of a photograph image in which the number of gray levels is large by lowering the color conversion accuracy of a character image in which the number of gray levels is small to a degree causing no problems within a memory capacity limit. Further, in the case of a character-and-photograph image, it is possible to perform color conversion separately for the character area and the photograph area.

In the present invention, output image data obtained by performing color conversion on input image data by the color converting device of the present invention is sent to an image forming apparatus to form an image on a sheet.

In the present invention, a computer is caused to execute a computer program for causing a computer to act as the color converting device of the present invention.

In the present invention, a computer program for causing a computer to act as the color converting device of the present invention is recorded on a recording medium, and a computer is caused to read and execute the computer program recorded on the recording medium.

According to the present invention, it is possible to improve the color conversion accuracy by increasing the number of grid points within a memory capacity limit of a lookup table or the like stored in the storage unit, and minimize the lowering of color conversion accuracy by minimizing the number of grid points to be decreased according to the memory capacity limit of the lookup table.

According to the present invention, it is possible to flexibly set the lookup tables or the like stored in the storage unit and efficiently use the memory capacity of the storage unit. Moreover, it is possible to flexibly set the lookup tables and improve the color conversion accuracy within the limited memory capacity.

According to the present invention, even when converting color components, it is possible to perform color conversion by using a circuit almost similar to that used when not converting color components. It is possible to improve the color conversion accuracy by causing almost no increase in the circuit scale.

According to the present invention, even when converting color components, it is possible to perform color conversion by using a circuit similar to that used when not converting color components.

According to the present invention, it is possible to improve the color conversion accuracy by increasing the number of grid points of a color component which has great influence on image quality within a memory capacity limit of a lookup table or the like stored in the storage unit, and minimize the lowering of color conversion accuracy by decreasing the number of grid points of a color component which has little influence on image quality according to the memory capacity limit of the lookup table.

According to the present invention, the structure of a processing unit for calculating neighboring grid points of the color components of input image data is simple, and it is possible to achieve high-speed processing, low cost, and small size. Moreover, when the distance of the grid points is $2^n$ (n is an integer smaller than the number of bits of each color component of input image data), since it is possible to calculate the grid points by bit shifting, the structure of the processing unit becomes simpler, and it is possible to further increase the speed and reduce the cost and the size.

According to the present invention, it is possible to perform color conversion using color correction values suitable for a type of an image based on input image data. For example, it is possible to perform color conversion using color correction values suitable for a type of a portion to be converted in an image based on input image data, and/or a type of a whole image. Further, it is possible to improve the color conversion accuracy within a limited memory capacity by setting the number of grid points for each type of an image based on input image data.

The above and further objects and features of the invention will more fully be apparent from the following detailed description with accompanying drawings.

BRIEF DESCRIPTION OF THE SEVERAL VIEWS OF THE DRAWINGS

FIGS. 1A and 2B are block diagrams showing an example of a color converting device of the present invention;

FIGS. 2A and 2B are views showing examples of a 1DLUT used by a data converting unit;

FIGS. 4A and 4B are block diagrams showing an example of the color converting device comprising a cyan data converting unit, a magenta data converting unit and a yellow data converting unit as the data converting unit;

FIGS. 10A and 10B are block diagrams showing an example of a color converting device that selects and uses any one of a plurality of kinds of 3DLUTs;

DETAILED DESCRIPTION OF THE INVENTION

Figure 3B:
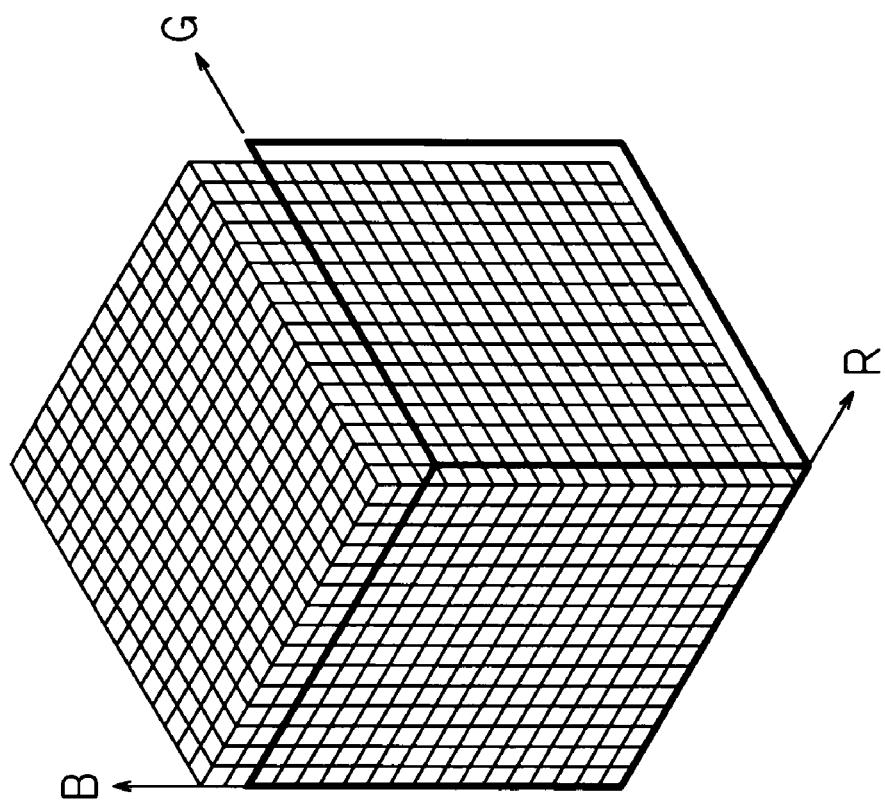
FIGS. 3A and 3B are views showing examples of the number of grid points.

The following description will explain in detail the present invention, based on the drawings illustrating some embodiments thereof. Note that the embodiments are illustrated by showing an example in which input image data represented by R (red), G (green), and B (blue) components (first color components), each of which is 8 bits, is converted into output image data represented by C (cyan), M (magenta), and Y (yellow) components (second color components), each of which is 8 bits.

EMBODIMENT 1

FIGS. 1A and 1B are block diagrams showing an example of a color converting device 10 of the present invention, and FIG. 1A continues on FIG. 1B. The color converting device 10 comprises a data converting unit 12 (a first data converting unit) into which image data represented by 8-bit R, G and B components is inputted; a bit separating unit 14 (a second data converting unit) into which later-described data is inputted from the data converting unit 12; a table access unit 16 (a second data converting unit) to which a three-dimensional lookup table (3DLUT) 18 is connected and later-described data is inputted from the bit separating unit 14; and a three-dimensional interpolation processing unit 20 (a second data converting unit) to which later-described data is inputted from the bit separating unit 14 and the table access unit 16, and which outputs image data represented by 8-bit C, M and Y components.

The bit separating unit 14 comprises a cyan bit separating unit 14$c$, a magenta bit separating unit 14$m$, and a yellow bit separating unit 14$y$. The table access unit 16 comprises a cyan table access unit 16$c$, a magenta table access unit 16$m$, and a yellow table access unit 16$y$. The 3DLUT 18 comprises a cyan 3DLUT 18$c$, a magenta 3DLUT 18$m$, and a yellow 3DLUT 18$y$. The three-dimensional interpolation processing unit 20 comprises a cyan three-dimensional interpolation processing unit 20$c$, a magenta three-dimensional interpolation processing unit 20$m$, and a yellow three-dimensional interpolation processing unit 20$y$. These units are connected according to each color.

Figure 9:
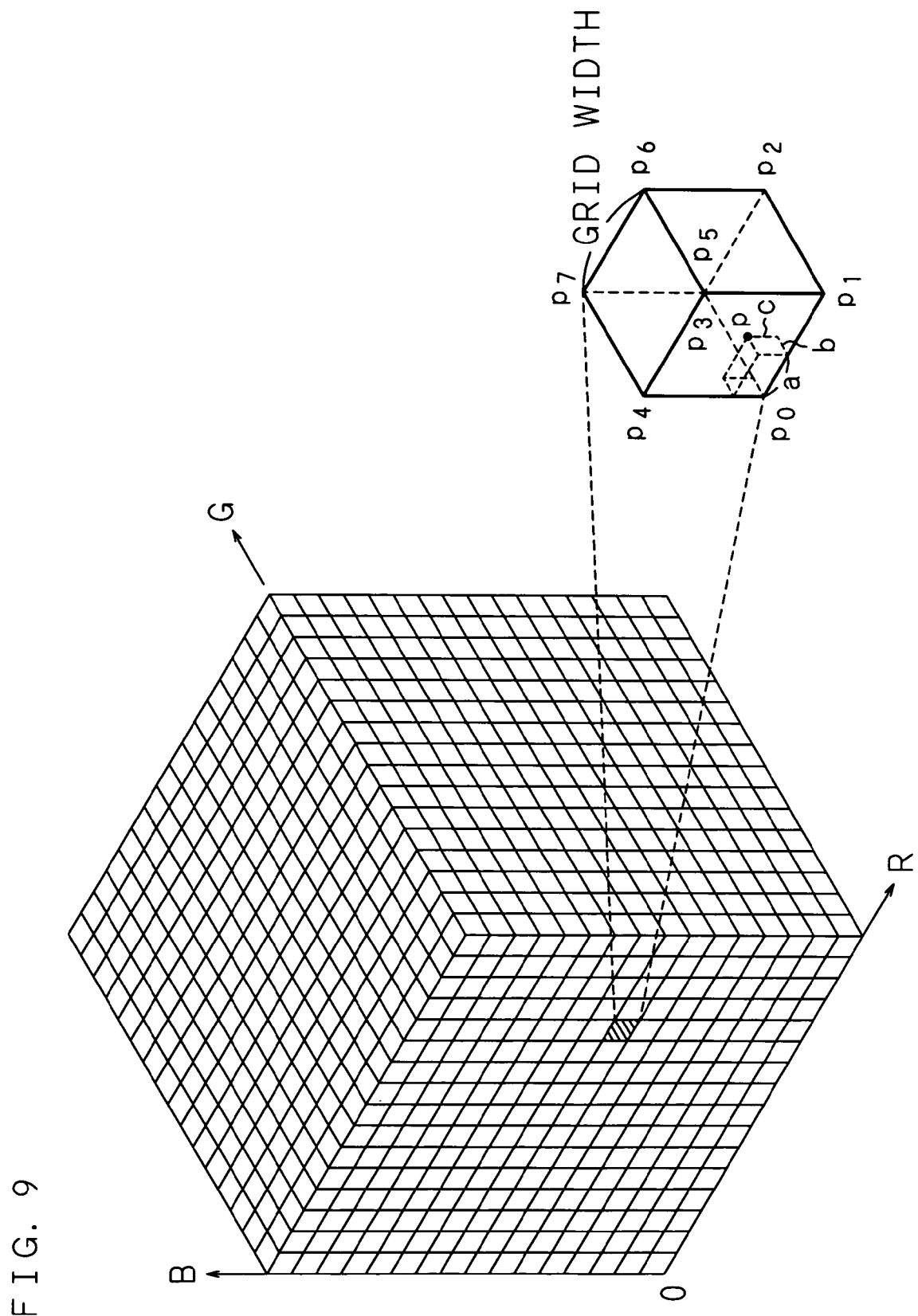
FIG. 9 is a view showing an outline of a three-dimensional interpolation method.

The following description will explain an example in which the grid width (the distance of grid points) is 16 ($=2^4$) as shown in FIG. 9, but it may also be possible to set the grid width to 8 or 32. When the grid width is set to 8, the conversion accuracy is improved compared with a grid width of 16, but the number of grid points increases and the memory capacity increases. When the grid width is set to 32, the number of grid points decreases and the memory capacity decreases compared with a grid width of 16, but the conversion accuracy is lowered.

The data converting unit 12 converts the number of bits of image data represented by 8-bit R, G, and B components, based on a one-dimensional lookup table (1DLUT). The 1DLUT is a one-dimensional LUT showing the corresponding input and output, and the data converting unit 12 comprises a 1DLUT for each of R, G and B components.

FIGS. 2A and 2B are views showing examples of the 1DLUTs used by the data converting unit 12. FIG. 2A shows a 1DLUT for converting an input between 0 and 255 into an output between 0 and 287. In this case, the grid width is 16, and the number of grid points in the 3DLUT 18 increases from 17 ($=2^{8-4}+1$) to 19. Moreover, since the output is between 0 and 287 ($=16\times(19-1)-1$), 9 bits are necessary. Note that when the output is 9 bits, it is possible to express 0 to 511, and it is possible to correspond to the number of grid points between 18 and 33. However, when the number of grid points is 33 or more, a better effect is obtained by decreasing the number of divisions of the grid, for example, by setting the grid width to a half, 8.

FIG. 2B shows a 1DLUT for converting an input ranging from 0 to 255 into an output ranging from 0 to 239. In this case, since the grid width is 16, and the number of grid points in the 3DLUT 18 decreases from 17 ($=2^{8-4}+1$) to 16. Moreover, since the output is between 0 and 239 ($=16\times(16-1)-1$), the output can be 8 bits. Note that when the output is 8 bits, it is possible to express 0 to 255, but when the number of grid points is 9 or less, a better effect is obtained by increasing the number of divisions of the grid, for example, by increasing the grid width by twice to 32, and thus it is possible to correspond to the number of grid points between 10 and 17.

The conversion method of the data converting unit 12 is not limited to the 1LDUT, and, for example, it may be possible to perform the calculation using functions corresponding to the straight lines shown by the solid lines in FIGS. 2A and 2B, or using functions corresponding to the curved lines shown by the broken lines. For example, the straight line of FIG. 2A can be calculated by (output)=(287/255)×(input).

When R', G' and B' components obtained by conversion in the data converting unit 12 are inputted to the bit separating unit 14 (cyan bit separating unit 14$c$, magenta bit separating unit 14$m$, and yellow bit separating unit 14$y$), each of the R', G' and B' components is divided into high order bits and low order bits. For example, if each of the color components (R', G', and B') converted by the data converting unit 12 is 8 bits, it is divided into high order 4 bits and low order 4 bits, while if each color component converted in the data converting unit 12 is 9 bits, it is divided into high order 5 bits and low order 4 bits. Here, if there are a 8-bit component and a 9-bit component among R', G' and B', it is possible to divide the 8-bit component (into high order 4 bits and low order 4 bits) and divide the 9 bit component (into high order 5 bits and low order 4 bits) separately, or it is possible to regard every components as a 9-bit component and divide each component (into high order 5 bits and low order 4 bits, but if each color component converted by the data converting unit 12 is 8 bits, the highest order bit is made "0" to realize the same function).

The high order bits of the R', G' and B' components separated by the bit separating unit 14 are inputted to the table access unit 16, and the low order bits are inputted to the three-dimensional interpolation processing unit 20. For example, the high order bits of the R', G' and B' components separated by the cyan bit separating unit 14c are inputted to the cyan table access unit 16c, and the low order bits are inputted to the cyan three-dimensional interpolation processing unit 20c. Similar processing is performed for magenta and yellow.

The 3DLUT 18 is a three-dimensional LUT storing color correction values corresponding to the R', G' and B' components, and color correction values for each of cyan, magenta, and yellow are stored in the cyan 3DLUT 18c, the magenta 3DLUT 18m, and the yellow 3DLUT 18y, respectively. When the grid width is 16, color correction values corresponding to values at intervals of 16, such as, for example, 0, 16, . . . , 240, 256, are stored. Color correction values corresponding to R', G' and B' after conversion by the data conversing unit 12 are stored in the cyan 3DLUT 18c, the magenta 3DLUT 18m, and the yellow 3DLUT 18y, respectively.

The table access unit 16 reads the color correction values corresponding to the high order bits of R', B' and G' from the 3DLUT 18. The color correction values read by the table access unit 16 are inputted to the three-dimensional interpolation processing unit 20. For example, the cyan table access unit 16c reads the color correction values corresponding to the high order bits of R', G' and B' inputted from the cyan bit separating unit 14c from the cyan 3DLUT 18c, and sends them to the cyan three-dimensional interpolation processing unit 20c. Similar processing is performed for magenta and yellow. The cyan table access unit 16c, magenta table access unit 16m and yellow table access unit 16y perform the reading processes corresponding to R', G' and B' converted by the data converting unit 12, respectively.

The three-dimensional interpolation processing unit 20 performs linear interpolation processing using the color correction values read from the 3DLUT 18 by the table access unit 16 and the low order bits separated by the bit separating unit 14, and outputs output image data represented by C, M and Y components. For example, the cyan three-dimensional interpolation processing unit 20c performs linear interpolation processing using the color correction values read from the cyan 3DLUT 18c by the cyan table access unit 16c and the low order bits separated by the cyan bit separating unit 14c, and outputs the 8-bit C component. Similar processing is also performed for magenta and yellow.

The interpolation processing method is not particularly limited, and it may be possible to use, for example, interpolation using 4 points as shown in Japanese Patent Application Laid-Open No. 58-16180 (1983), 8-point interpolation, 6-point interpolation, etc. The following description will illustrate an example of 8-point interpolation. As shown in FIG. 9, if the relative ratio to the grid width in the grid of arbitrary input image data p is (a, b, c), an interpolated value f (p) by 8-point interpolation (cubic interpolation) is calculated by the following equation by defining that a color correction value at a grid point $p_i$ is $f(p_i)$.

$$f(p)=(1-a)(1-b)(1-c)\cdot f(p_0)+a(1-b)(1-c)\cdot f(p_1)+ab(1-c)\cdot f(p_2)+(1-a)b(1-c)\cdot f(p_3)+(1-a)(1-b)c\cdot f(p_4)+a(1-b)c\cdot f(p_5)+abc\cdot f(p_6)+(1-a)bc\cdot f(p_7).$$

While keeping the grid width of each color component in the 3DLUT 18 at 16, the number of grid points is increased or decreased within a range of 10 ($=2^{4-1}+2$) to 32 ($=2^{4+1}$) based on the standard value 17 ($=2^{8-4}+1$). However, it may be possible to increase or decrease the number of grid points for at least one of R, G and B. Hence, there may be a component for which the number of grid points is not increased or decreased among R, G and B, and, for example, if the number of grid points is increased or decreased for only G and B, there is no need to perform conversion for R in the data converting unit 12. Further, the increase or decrease of the number of grid points can be performed by increasing any of R, G and B and decreasing the other. When increasing or decreasing the grid points, the number of grid points to be increased or decreased can be an arbitrary number. Thus, since it is possible to increase or decrease an arbitrary number of grid points for each of R, G and B, it is possible to adjust the 3DLUT 18 to an arbitrary capacity size, and the memory space can be used effectively.

Figure 3A:
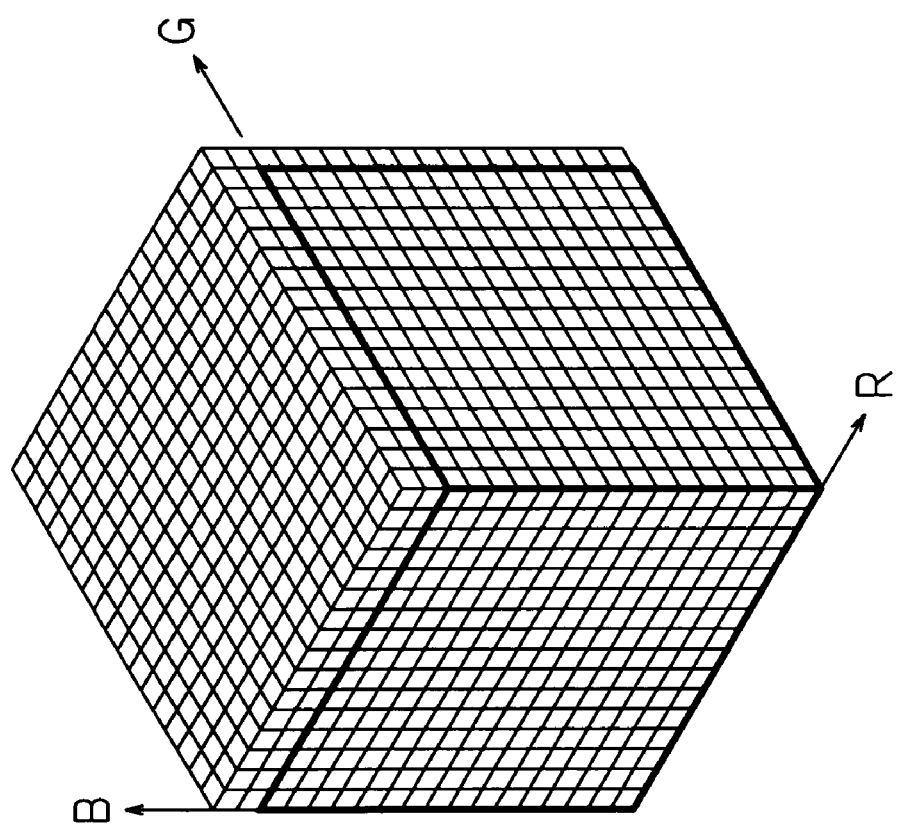

FIGS. 3A and 3B are views showing examples of the number of grid points in the 3DLUT 18. In the example of FIG. 3A, the number of grid points of R' is 17 ($=2^{8-4}+1$), the number of grid points of G' is increased to 18 ($=2^{8-4}+1)+1$) and the number of grid points of B' is increased to 19 ($=2^{8-4}+1)+2$) based on the standard value 17. In the example of FIG. 3B, the number of grid points of R' and G' is decreased to 16 ($=2^{8-4}+1)-1$), and the number of grid points of B' is increased to 19 ($=2^{8-4}+1)+2$).

It is possible to increase or decrease the number of grid points of each color component according to the characteristics of a device, such as the characteristics of a CCD. For example, it is possible to set the number of grid points to 17(R')×19(G')×17(B'). In general, since the human eye has higher sensitivity to green than the others among red, green and blue, it is possible to perform highly accurate color conversion for the human eye by increasing the number of grid points of green compared with the others.

Further, the number of bits of R, G and B components of input image data is not limited to 8 bits, and may be 10 bits or 14 bits, for example. Similarly, the number of bits of C, M and Y components of output image data is not limited to 8 bits.

EMBODIMENT 2

It may also be possible to change the number of grid points to be increased or decreased, according to the types (cyan, magenta, and yellow) of the 3DLUTs 18. For example, it is possible to set the number of grid points as follows:

cyan 3DLUT 18c: 20(R')×18(G')×18(B'), magenta 3DLUT 18m: 18(R')×20(G')×18(B'), and yellow 3DLUT 18y: 18(R')×18(G')×20(B').

The complementary color of cyan is red, the complementary color of magenta is green, and the complementary color of yellow is blue. By increasing the number of grid points of a complementary color compared with the others, it is possible to perform highly accurate conversion.

Figure 4B:
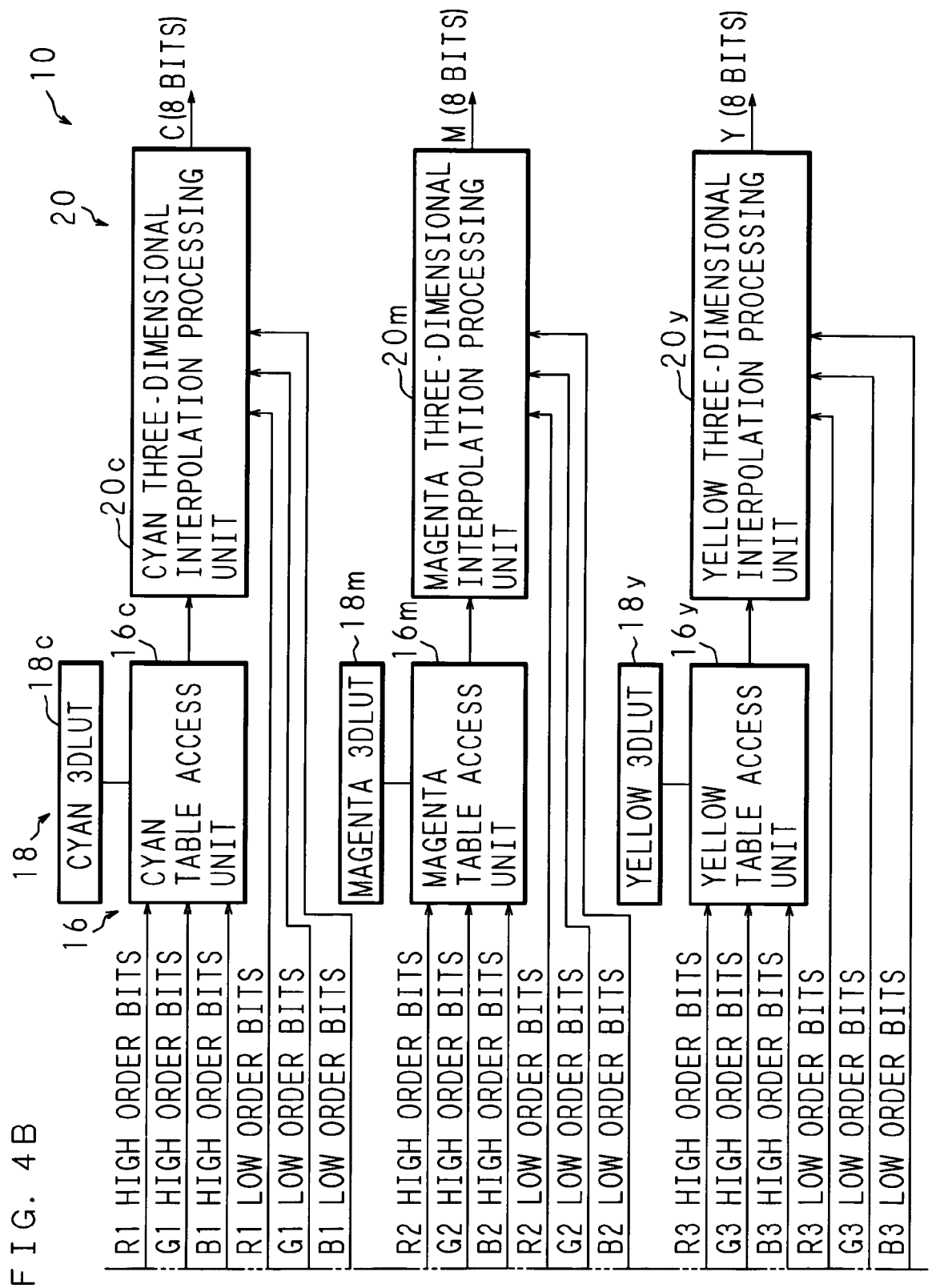

In this case, however, it is necessary to provide a data converting unit 12 for each of cyan, magenta, and yellow. FIGS. 4A and 4B are block diagrams showing an example of the color converting device 10 comprising a cyan data converting unit 12c, a magenta data converting unit 12m and a yellow data converting unit 12y as the data converting unit 12, and FIG. 4A continues on FIG. 4B.

The 8-bit R, G and B components are inputted to the cyan data converting unit 12c, the magenta data converting unit 12m, and the yellow data converting unit 12y, respectively. The converted R1, G1, B1 components are sent to the cyan bit separating unit 14c from the cyan data converting unit 12c, and then processing is performed in the same manner as in FIGS. 1A and 1B (but R1, G1 and B1 correspond to R', G' and B'). Since the same processing is also performed for other colors, the converted R2, G2, B2 components are sent to the magenta bit separating unit 14m from the magenta data converting unit 12m, and the converted R3, G3, B3 components are sent to the yellow bit separating unit 14y from the yellow data converting unit 12y.

EMBODIMENT 3

Figure 5:
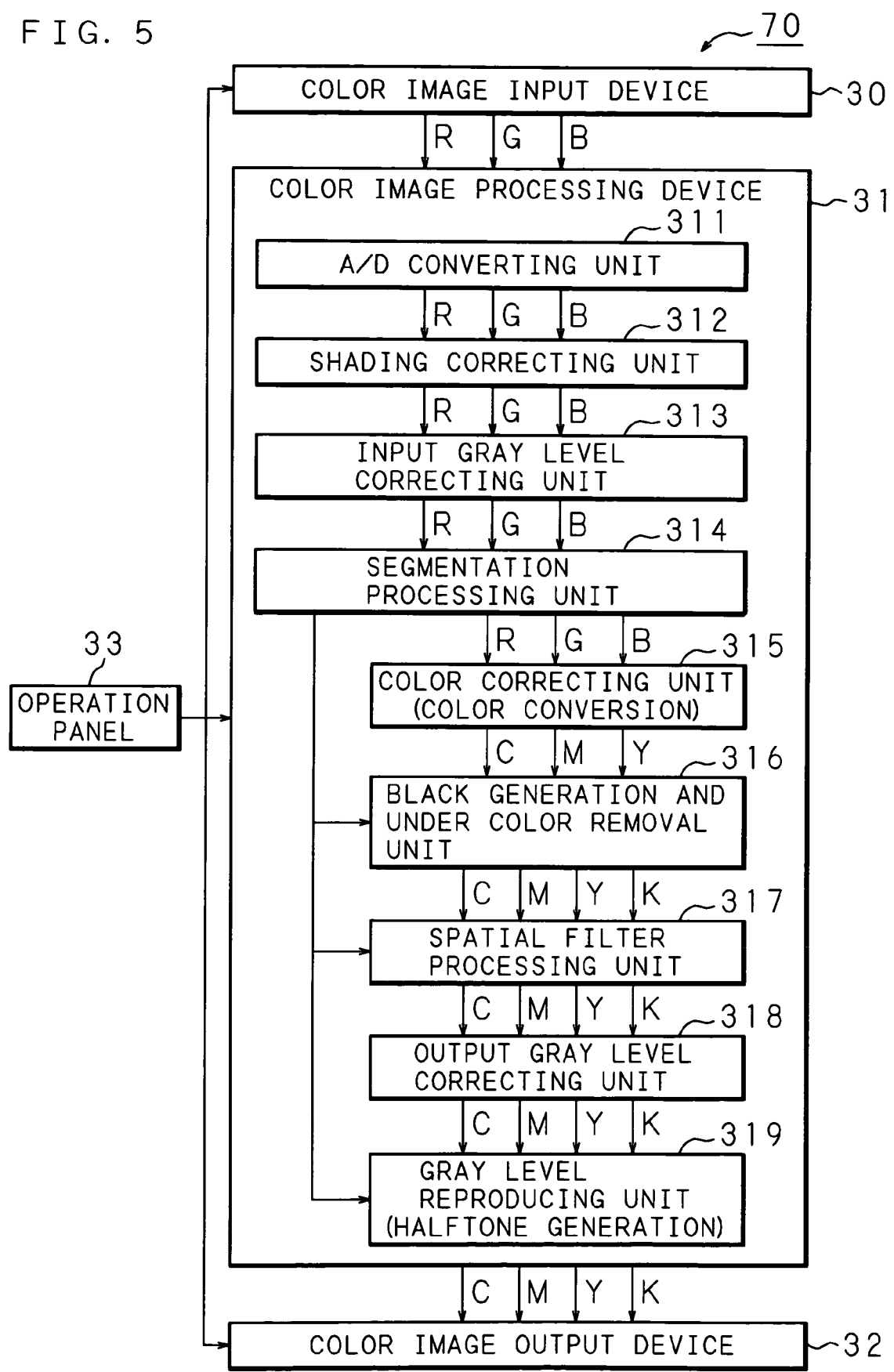
FIG. 5 is a block diagram showing one example of the structure of an image forming apparatus of the present invention.

FIG. 5 is a block diagram showing one example of the structure of an image forming apparatus 70 of the present invention. In this explanation, the image forming apparatus 70 acts as a digital color copying machine. The image forming apparatus 70 comprises a color image processing device 31, a color image input device 30, a color image output device 32 and an operating panel 33 connected to the color image processing device 31. Moreover, although not shown in FIG. 5, the image forming apparatus 70 comprises a CPU (Central Processing Unit) for controlling the respective devices in the image forming apparatus 70.

The color image input device 30 comprises a CCD (Charge Coupled Device), for example, reads an image of reflected light from a document by the CCD, and generates RGB analog signals. The generated RGB analog signals are sent to the color image processing device 31.

The color image processing device 31 comprises an A/D (analog/digital) converting unit 311, a shading correcting unit 312, an input gray level correcting unit 313, a segmentation processing unit 314, a color correcting unit 315, a black generation and under color removal unit 316, a spatial filter processing unit 317, an output gray level correcting unit 318, a gray level reproducing unit 319, and a controller (not shown) for controlling the respective units. The color correcting unit 315 performs a color correction process including processing similar to that performed by the above-described color converting device 10 of Embodiment 1 or 2.

The color image processing device 31 converts the RGB analog signals received from the color image input device 30 into RGB digital signals, performs various image processing such as a color conversion process and a correction process, generates CMYK (C: cyan, M: magenta, Y: yellow, K: black) digital signals, and sends the generated CMYK digital signals to the color image output device 32.

The A/D converting unit 311 receives the RGB analog signals from the color image input device 30, converts the received RGB analog signals into RGB digital signals, and sends the RGB digital signals to the shading correcting unit 312. The shading correcting unit 312 performs the process of removing various distortions caused in the illuminating system, imaging system and image capturing system of the color image input device 30 on the digital RGB signals received from the A/D converting unit 311, and then sends the resulting signals to the input gray level correcting unit 313. The input gray level correcting unit 313 adjusts the -color balance of the RGB digital signals (RGB reflectance signals) received from the shading correcting unit 312, converts the RGB digital signals into density signals, etc. that are easily processed by the image processing system employed in the color image processing device 31, and then sends the resulting signals to the segmentation processing unit 314.

The segmentation processing unit 314 separates the pixels in the image of the RGB digital signals received from the input gray level correcting unit 313 into any of a character area, a dot area and a photograph area, and outputs an area identification signal indicating to which area each pixel belongs to the black generation and under color removal unit 316, spatial filter processing unit 317 and gray level reproducing unit 319, based on the separation result. The RGB digital signals received from the input gray level correcting unit 313 are sent as they are to the color correcting unit 315.

The color correcting unit 315 converts the RGB digital signals sent from the input gray level correcting unit 313 into CMY signals, and also performs the process of eliminating color turbidity based on the spectral characteristics of CMY color material including unnecessary absorption components to achieve faithful color reproduction, and then sends the resulting signals to the black generation and under color removal unit 316. The black generation and under color removal unit 316 performs black generation for generating a black signal (K signal) from three color signals (C signal, M signal and Y signal) of the CMY signals received from the color correcting unit 315, generates new CMY signals by subtracting the K signal obtained by black generation from the original CMY signals, and sends four color signals of CMYK (CMYK signals) to the spatial filter processing unit 317.

As a general black generation process, there is a method of generating black by skeleton black. In this method, if the input and output characteristic of the skeleton curve is y=f(x), input data are C, M and Y, output data are C', M', Y' and K', and the UCR (Under Color Removal) rate is $\alpha(0<\alpha<1)$, then the following are expressed $$K'=f\{\min(C, M, Y)\}$$

$$C'=C-\alpha K'$$

$$M'=M-\alpha K'$$

$$Y'=Y-\alpha K'.$$

The spatial filter processing unit 317 performs a spatial filter process on the image of the CMYK signals received from the black generation and under color removal unit 316 by using a digital filter based on the area identification signal, and performs the process of correcting the spatial frequency characteristics to eliminate a blur or granular deterioration of the image. Moreover, the output gray level correcting unit 318 performs an output gray level correcting process, and the gray level reproducing unit 319 performs a predetermined process on the image data of CMYK signals based on the area identification signal.

For example, for an area separated as a character area by the segmentation processing unit 314, in order to improve reproducibility of, especially, black characters or color characters, the amount of emphasis of high frequency is increased by a sharpness emphasizing process included in the spatial filter process performed by the spatial filter processing unit 317. The gray level reproducing unit 319 performs a gray level reproducing process (halftone generation) to execute binarization or multivalued-converting of high resolution suitable for reproduction of high frequency.

Further, for an area separated as a dot by the segmentation processing unit 314, a low-pass filter process to remove the inputted dot component is performed in the spatial filter processing unit 317. Then, the output gray level correcting unit 318 performs an output gray level correction process for converting a signal such as a density signal into a rate of dot area that is a characteristic value of the color image output device 32, and then the gray level reproducing unit 319 performs a gray level reproducing process for finally separating the image into pixels and binarizing or multivalued-converting the pixels to reproduce the respective gray levels.

Further, for an area separated as a photograph by the segmentation processing unit 314, the gray level reproducing unit 319 performs a gray level reproducing process to execute binarization or multivalued-converting by attaching great importance to the gray level reproducibility.

The output image data on which the gray level reproducing process was performed is temporarily stored in storage means (not shown), and outputted at a predetermined timing to the color image output device 32. The color image output device 32 is a device for forming an image on a recording medium such as paper, based on the CMYK signals received from the color image processing device 31. For example, it is possible to use an electrophotographic type or ink jet type color image output device.

The operating panel 33 comprises input means for allowing an operator to input instructions by operating keys, and display means such as a liquid crystal panel. The operator's instruction is outputted as a control signal from the operating panel 33 to the color image input device 30, color image processing device 31 and color image output device 32. According to the operator's instruction, a document image is read by the color image input device 30, and after the color image processing device 31 performs data processing, the color image output device 32 forms an image on a sheet, thereby functioning as a digital color copying machine. The above-mentioned processes are controlled by the CPU (not shown).

EMBODIMENT 4

Figure 6:
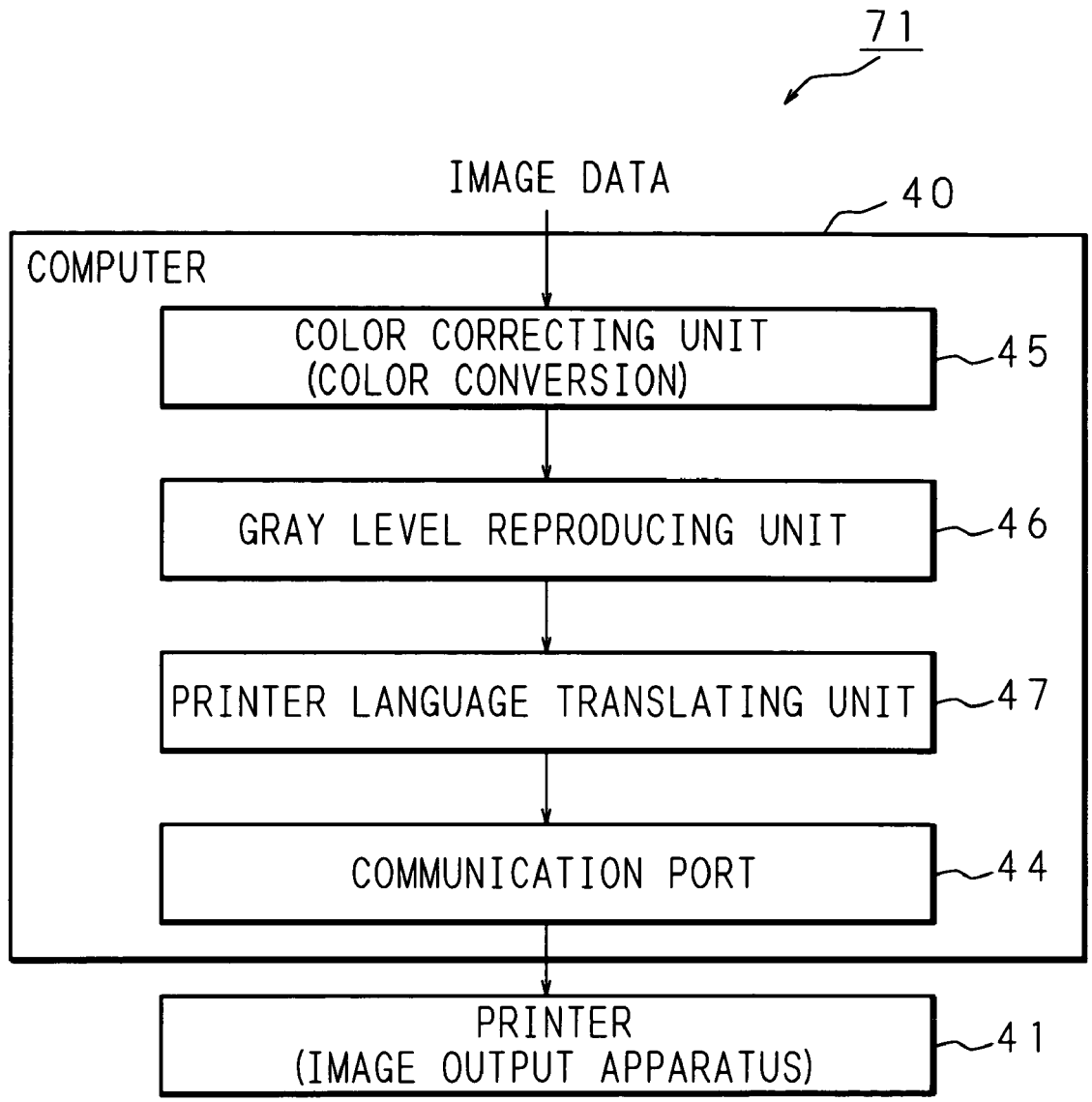
FIG. 6 is a block diagram showing one example of the structure of an image forming system.

FIG. 6 is a block diagram showing one example of the structure of an image forming system 71. The image forming system 71 comprises a computer 40 and a printer 41. The printer 41 may be a digital multi-function machine having a copy function and a facsimile function in addition to a printer function. The printer 41 performs electrophotographic type or ink jet type image formation.

Image data is inputted to the computer 40, for example, from a scanner such as a flat bed scanner or a film scanner, or a digital camera, and stored in a memory device such as a hard disk (not shown). The image data inputted to the computer 40 can be processed and edited by executing various application programs. The computer 40 acts as a color correcting unit 45 for performing a color conversion process from RGB into CMY and a color correction process on output image data, a gray level reproducing unit 46 for performing a halftone generation process, and a printer language translating unit 47 for converting the output image data into a printer language. In the color correcting unit 45, a black generation and under color removal process is also performed. Moreover, the color correcting unit 45 performs a color correction process including a color conversion process similar to that performed by the above-described color converting device 10 of Embodiment 1 or 2. The data converted into a printer language by the printer language translating unit 47 is outputted to the printer 41 through a communication port 44 (RS232C, LAN, etc.).

Figure 7:
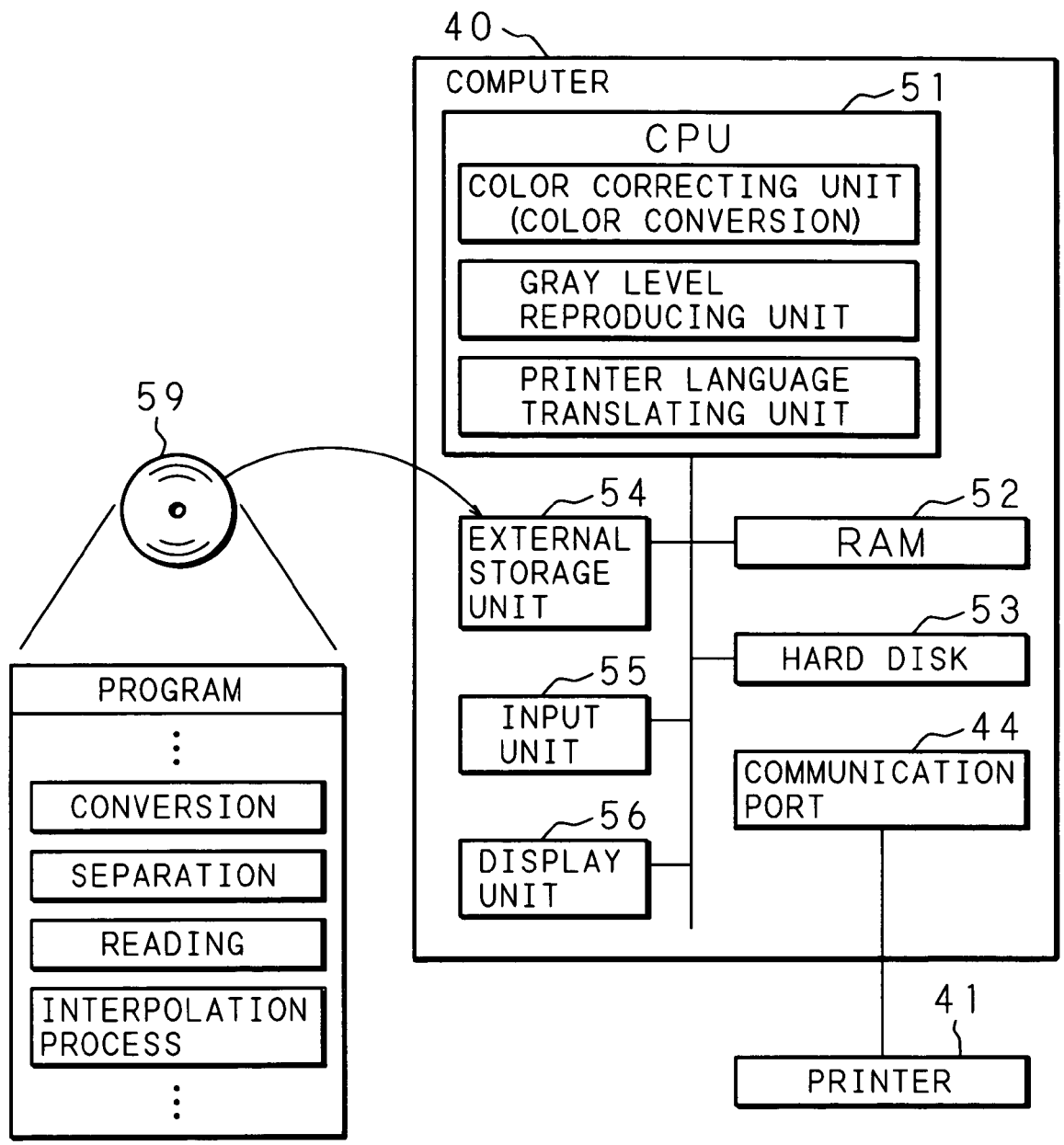
FIG. 7 is a block diagram showing one example of the structure of a computer.

FIG. 7 is a block diagram showing one example of the structure of a computer. The computer 40 comprises a CPU (Central Processing Unit) 51, a RAM (Random Access Memory) 52 such as a DRAM, a hard disk drive (hereinafter referred to as a hard disk) 53, an external storage unit 54 such as a flexible disk drive or a CD-ROM drive, and a communication port 44 for performing communication and control with the printer 41. Moreover, the computer 40 comprises an input unit 55 such as a keyboard or a mouse, and a display unit 56 such as a CRT display or a liquid crystal display. The communication port 44 includes a network card or a modem, and can be connected to a communication network such as a LAN (Local Area Network), the Internet or a telephone line.

The CPU 51 controls the above-described units 52 through 56 and 44. The CPU 51 stores a program or data received from the input unit 55 or the communication port 44, or a program or data read from the hard disk 53 or the external storage unit 54, in the RAM 52, performs various processes, such as execution of a program stored in the RAM 52 or processing of data, and stores various processing results or temporary data for use in various processes in the RAM 52. The data such as the processing results stored in the RAM 52 are stored on the hard disk 53 or outputted from the display unit 56 or the communication port 44 by the CPU 51.

The CPU 51 acts as the above-described color correcting unit 45, gray level reproducing unit 46 and printer language translating unit 47. The image data is inputted to the computer 40 from a scanner or a digital camera, for example, and stored on the hard disk 53.

The CPU 51 acts as the data converting unit 12, bit separating unit 14, table access unit 16, and three-dimensional interpolation processing unit 20 of Embodiment 1 or 2 (FIGS. 1A and 1B or FIGS. 4A and 4B). Besides, the 1LDUT for use in data conversion by the data converting unit 12 and the 3DLUT 18 used by the table access unit 16 are stored on the hard disk 53.

By reading a computer program recorded on a recording medium 59 such as a CD-ROM by the external storage unit 54, storing the computer program on the hard disk 53 or RAM 52 and executing the program by the CPU 51, it is possible to cause the CPU 51 to act as the above-described respective units. It may also be possible to receive a computer program from other device through the communication port 44 connected to a LAN (Local Area Network), etc. and store it on the hard disk 53 or RAM 52.

Figure 8:
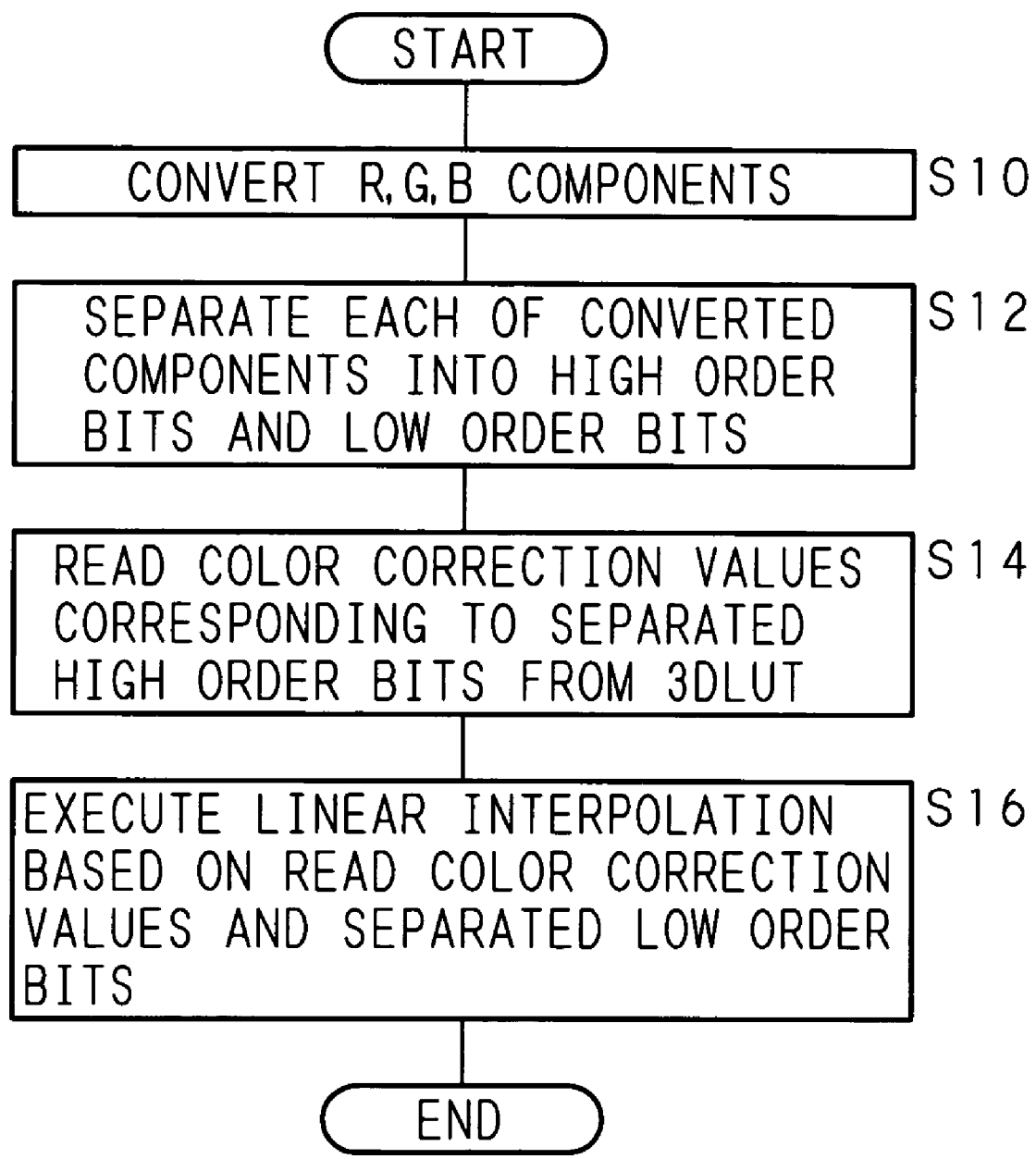
FIG. 8 is a flowchart showing an example of the steps of the process of color conversion from RGB into CMY according to the present invention.

FIG. 8 is a flowchart showing an example of the steps of the process of color conversion from RGB into CMY. The CPU 51 converts R, G, B components of input image data stored on the hard disk 53, based on the LDLUT stored on the hard disk 53 (S10), separates each of the converted components R', B', G' into high order bits and low order bits (S12), and stores them in the RAM 52 or hard disk 53. The conversion and separation are performed in the same manner as in Embodiment 1.

The CPU 51 reads color correction values corresponding to the separated high order bits from the 3DLUT stored on the hard disk 53 (S14), stores the read values in the RAM 52 or hard disk 53 and executes linear interpolation based on the color correction values and the separated low order bits (S16), and finds C, M, Y components and stores them in the RAM 52 or hard disk 53. The reading and linear interpolation are performed in the same manner as in Embodiment 1.

EMBODIMENT 5

Although the above-described embodiments are explained by illustrating a case where one kind of 3DLUT is used for each of cyan, magenta, and yellow as the 3DLUT storing color correction values, it may be possible to select and use any one of a plurality of kinds of 3DLUTs. For example, it may be possible to prepare a 3DLUT for each type of input image.

Figure 10B:
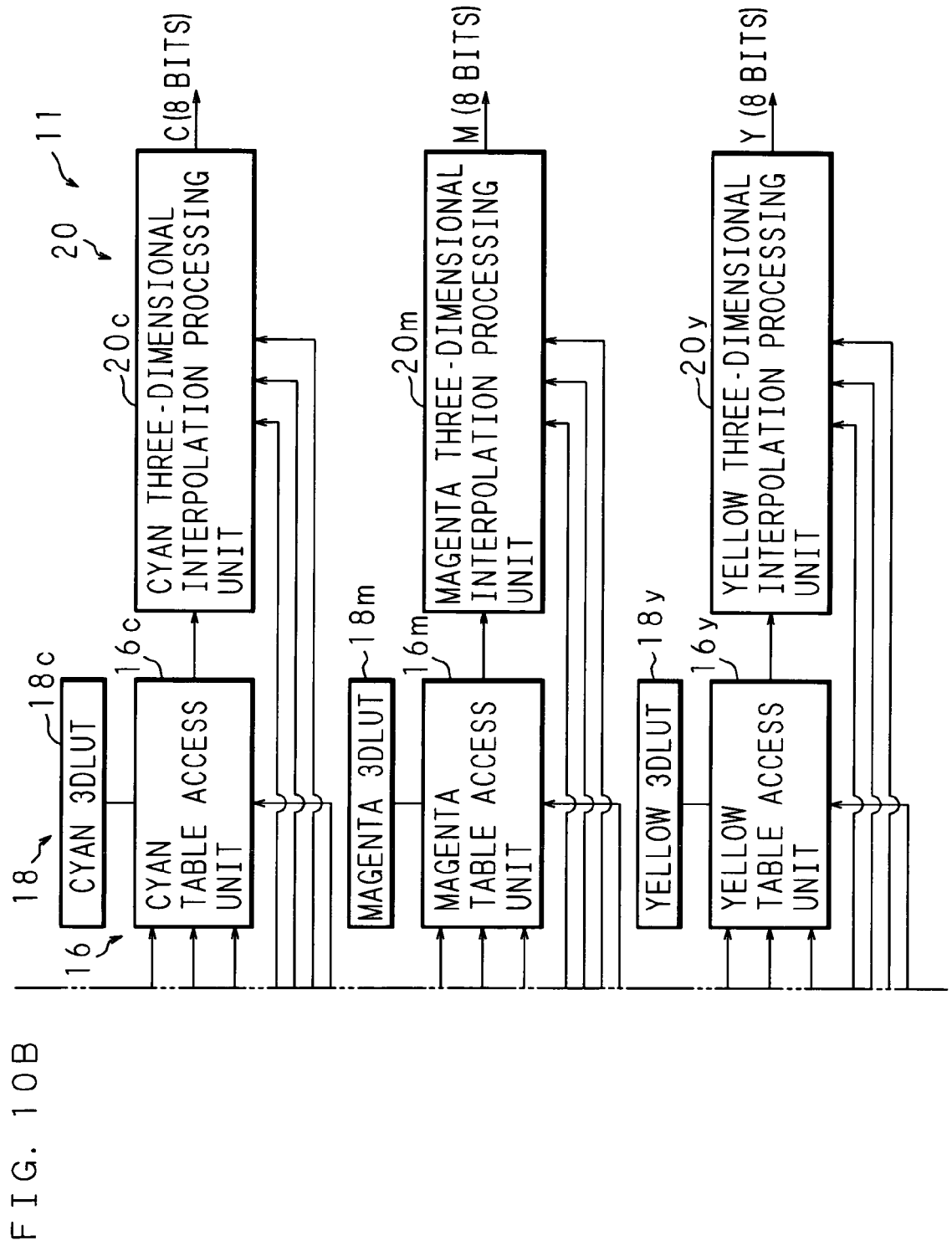
Figure 11A:
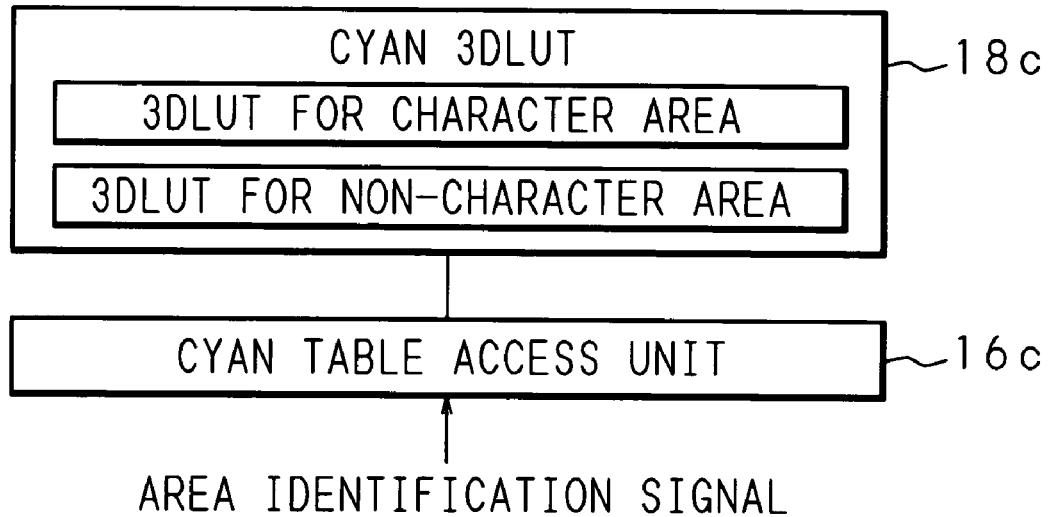
FIGS. 11A and 11B are essential enlarged block diagrams of a cyan table access unit and a cyan 3DLUT portion shown in FIG. 10B.

FIGS. 10A and 10B are block diagrams showing an example of a color converting device that selects and uses any one of a plurality of kinds of 3DLUTs, and FIG. 10A continues on FIG. 10B. FIG. 11A is an essential enlarged block diagram of the cyan table access unit 16c and cyan 3DLUT 18c shown in FIG. 10B. The basic structure of a color converting device 11 is the same as that in Embodiment 1 (FIGS. 1A and 1B). However, the 3DLUT 18 includes a plurality of 3DLUTs, and in the example shown in FIG. 11A, the 3DLUT 18 includes a 3DLUT for a character area and a 3DLUT for a non-character area. In addition, an area identification signal indicating that input image data is a character area or a non-character area is inputted to the data converting unit 12 and the table access unit 16, and a LUT to be used is selected based on the inputted area identification signal. Note that similarly to the cyan 3DLUT 18c, the magenta 3DLUT 18m and the yellow 3DLUT 18y include a 3DLUT for character area and a 3DLUT for a non-character area, and a 3DLUT is selected based on an area identification signal.

In the 3DLUT for a character area, for example, the grid width is 16, and the number of grid points is 13(R')×13(G')×13(B'). In the 3DLUT for a non-character area, the grid width is 16, and the number of grid points is 19(R')×19(G')×19(B'). In the character area, the number of gray levels is small and troubles such as a tone gap will hardly occur, and therefore it is possible to obtain sufficient color correction accuracy even with a smaller number of grid points than in an area other than a character area. Moreover, in order to reproduce easily readable characters, color correction values are set so that a slightly brighter reproduction than the original is obtained. On the other hand, in areas other than a character area, such as a dot area, a photograph area and a ground area (the paper surface), the number of gray levels is large and a tone gap will occur easily, and therefore it is necessary to increase the number of grid points compared with a character area. Further, color correction values are set so that a reproduction of dots, a photograph, etc. is a faithful reproduction of the original.

By decreasing the number of grid points in the 3DLUT for a character area to 13 from the standard value 17, it is possible to reduce the data size of the 3DLUT. However, when the number of grid points is decreased, the color conversion accuracy is lowered, but in the case of a character area, sufficient color conversion accuracy is obtained even with a small number of grid points. On the other hand, by increasing the number of grid points in the 3DLUT for a non-character area to 19 from the standard value 17, it is possible to improve the color conversion accuracy. However, when the number of grid points is increased, the data size of the 3DLUT is increased, but since the data size of the 3DLUT for a character area is decreased, there is almost no change in the total data size and thus it is possible to improve the color conversion accuracy within the memory capacity limit. For example, when the number of grid points is 17×17×17=4913 in both the 3DLUTs for a character area and a non-character area, the total size is 4913×2=9826. However, in the present invention, the number of grid points in the 3DLUT for a character area is 13×13×13=2197 and the number of grid points in the 3DLUT for a non-character area is 19×19×19=6859, and therefore the total size is 2197+6859=9056.

For example, when the area identification signal indicates a non-character area, since the 3DLUT for a non-character area in which the number of grid points is 19 that is greater than the standard value 17 is selected, the data converting unit 12 performs conversion using a 1DLUT similar to the 1DLUT used when increasing the grid points shown in FIG. 2A so that output values ranging from 0 to 287 are obtained from input values ranging from 0 to 255. In this case, an output value is 9 bits. On the other hand, for example, when the area identification signal indicates a character area, since the 3DLUT for a character area in which the number of grid points is 13 that is smaller than the standard value 17 is selected, the data converting unit 12 performs conversion using a 1DLUT similar to the 1DLUT used when decreasing the grid points shown in FIG. 2B so that output values ranging from 0 to 191 are obtained from input values ranging from 0 to 255. In this case, an output value is 8 bits, but it may be possible to produce 9-bit output values whose highest order bit is always "0". Note that the 1DLUT for a character area, the 1DLUT for a non-character area, and the corresponding relationship between the area identification signal and 1DLUT are stored in the data converting unit 12 in advance.

The bit separating unit 14 performs processing similar to that performed in Embodiment 1 (FIGS. 1A and 1B). The table access unit 16 reads color correction values from the 3DLUT 18, based on the high order bits separated by the bit separating unit 14 and the area identification signal. For example, when the area identification signal indicates a character area, the cyan table access unit 16c reads correction values corresponding to the high order bits of R', G', B' from the 3DLUT for a character area. Similarly to the cyan table access unit 16c, the magenta table access unit 16m and the yellow table access unit 16y read color correction values from a 3DLUT corresponding to the area identification signal. Note that the corresponding relationship between the area identification signal and the 3DLUT is stored in the table access unit 16 in advance. The three-dimensional interpolation processing unit 20 performs processing similar to that performed in Embodiment 1 (FIGS. 1A and 1B).

Figure 11B:
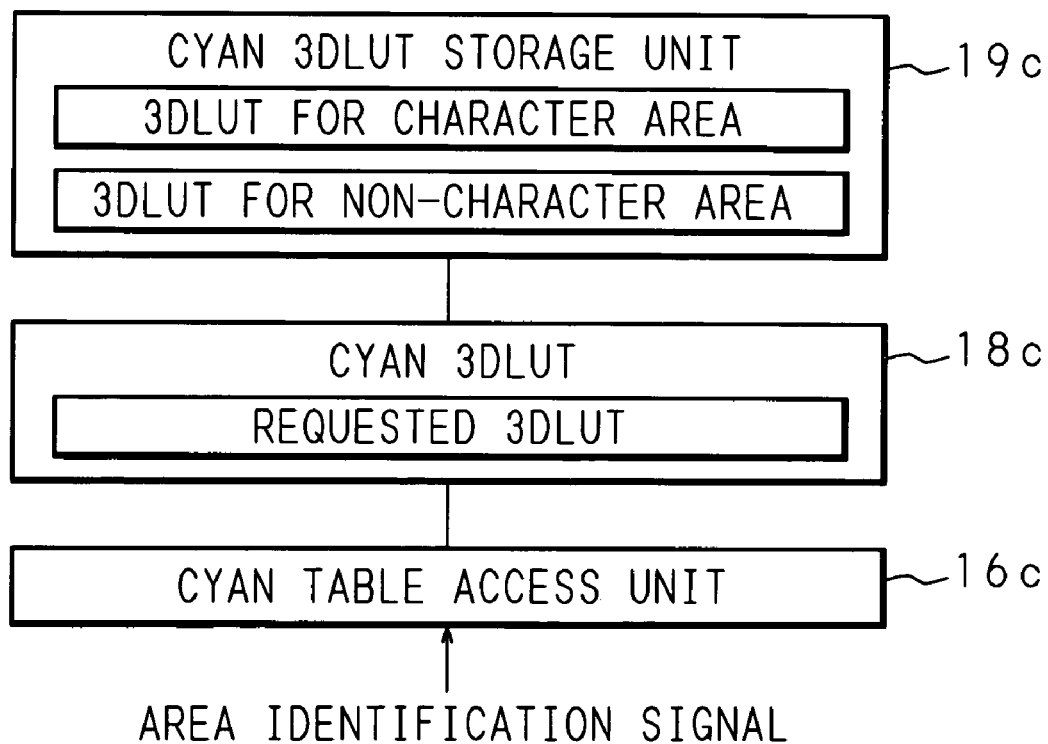

When using a plurality of 3DLUTs, it is possible to store a plurality of 3DLUTs in a 3DLUT storage unit and read a necessary 3DLUT. FIG. 11B is an essential enlarged block diagram of the cyan table access unit 16c and cyan 3DLUT 18c shown in FIG. 10B. A cyan 3DLUT storage unit 19c storing the 3DLUT for a character area and the 3DLUT for a non-character area is connected to the cyan 3DLUT 18c, and the cyan 3DLUT 18c reads a 3DLUT requested from the cyan table access unit 16c from the cyan 3DLUT storage unit 19c. The cyan 3DLUT storage unit 19c is a ROM or a hard disk, for example, and the cyan 3DLUT 18c is a RAM, for example.

In the above explanation, the 3DLUT for a character area with 13(R')×13(G')×13(B') and the 3DLUT for a non-character area with 19(R')×19(G')×19(B') are used, but it may of course be possible to set the number of grid points for each of color components (R', G', B') by setting, for example, 19(R')×21(G')×19(B') in the 3DLUT for a non-character area. Moreover, although the above explanation explains two kinds of areas, namely a character area and a non-character area, as examples, it may of course be possible to use 3DLUTs corresponding to three kinds of areas, for example, a character area, a photograph area and a dot area.

EMBODIMENT 6

Figure 12:
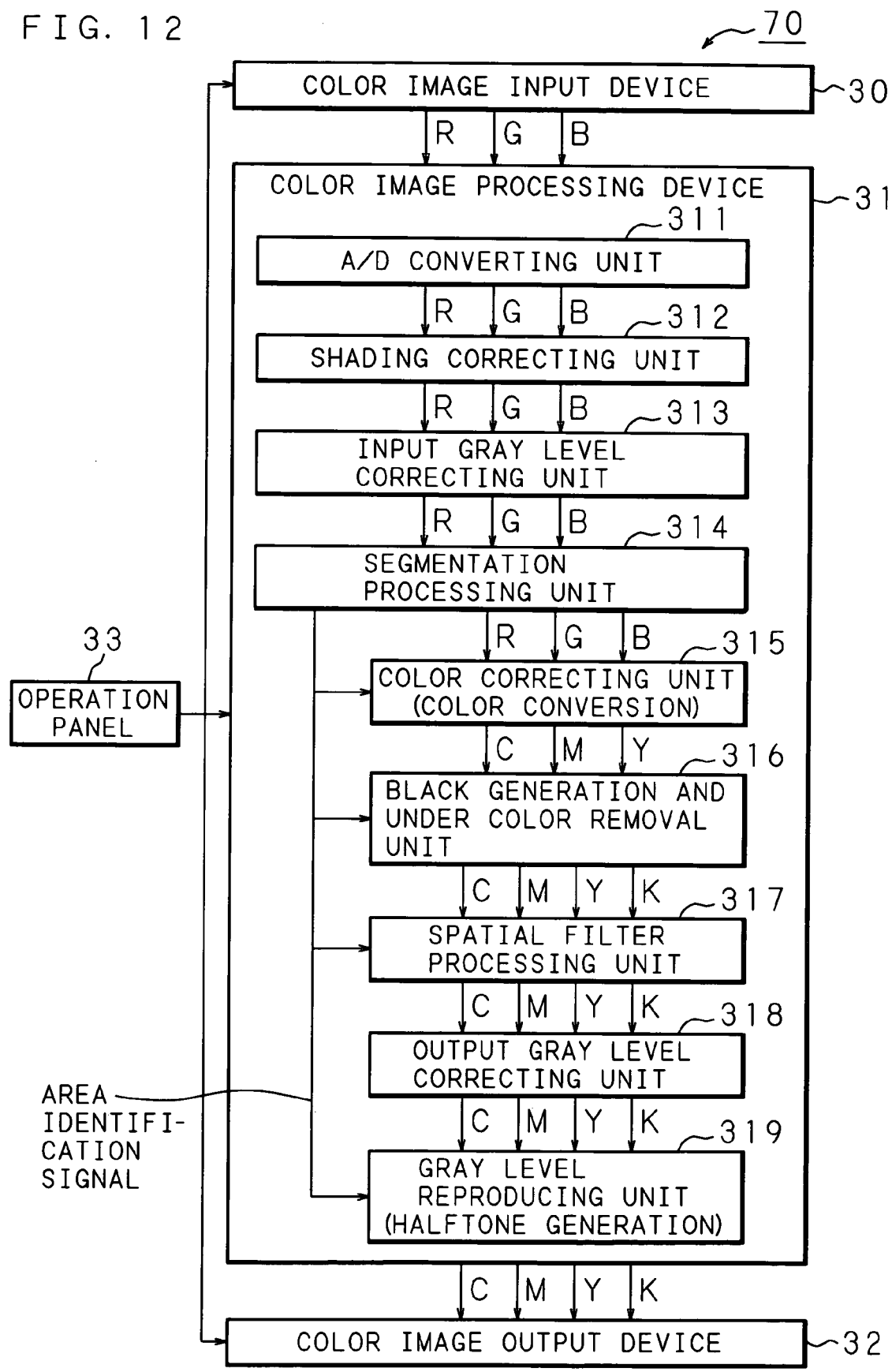
FIG. 12 is a block diagram showing another example of the structure of an image forming apparatus of the present invention.

FIG. 12 is a block diagram showing another example of the structure of the image forming apparatus 70 of the present invention. The structure of the image forming apparatus 70 shown in FIG. 12 is the same as that in Embodiment 3 (FIG. 5). However, the area identification signal outputted from the segmentation processing unit 314 is also inputted to the color correcting unit 315, and the color correcting unit 315 acts as the color converting device described in Embodiment 5 (FIGS. 10A and 10B).

Although the area identification method performed by the segmentation processing unit 314 is not particularly limited, it may be possible to use the following method, for example. In this method, the following judgment is made in a block of M×N pixels (M and N are natural numbers) with a target pixel at the center, and the result is used as an area identification signal of the target pixel.

An average value Dave of the signal level of the central 9 pixels in the block is calculated, and each pixel in the block is binarized using the calculated average value Dave. Moreover, a maximum value Dmax and a minimum value Dmin of the signal level of the pixels are also found.

A dot area is identified based on its characteristics that the change of the signal level in a small area is large and the density is higher compared with the background. In the binarized data, the number KH of changes from 0 to 1 and the number KV of changes from 1 to 0 are found for each of the main-scanning direction and the sub-scanning-direction in the block, and the found numbers KH and KV are compared with threshold values TH and TV, respectively. If both of the values exceed the threshold values, then the block is identified as a dot area. However, in order to avoid a misjudgment of the background, the differences between the previously found Dmax, Dmin and the Dave are compared with threshold values B1 and B2. Hence, if the following conditions are all satisfied, the block is judged to be a dot area.

$KH>TH$ $KV>TV$ $Dmax-Dave>B1$ $Dave-Dmin>B2$

If all the conditions are not satisfied, the block is judged to be a non-dot area, and further a judgment is made as to whether the block is a character area or a photograph area.

A character area is identified based on its characteristics that the difference between the maximum signal level and the minimum signal level is large and the density is high. The difference Dsub between the maximum value Dmax and the minimum value Dmin found when judging a dot area is compared with a threshold value Pc. If the condition Dsub>Pc is satisfied, the block is judged to be a character area, while if the condition is not satisfied, the block is judged to be a photograph area. In this judgment method, a photograph area includes a ground area. In order to find a ground area, it may be possible to compare the density values of the respective color components of the target pixel with a predetermined threshold value, and if all the density values are greater than the threshold value, the target pixel is judged to be a ground area. In Embodiment 5 described above, a judgment is made as to whether the target pixel is a character area or a non-character area, and a non-character area includes a photograph area and a dot area.

EMBODIMENT 7

Figure 13:
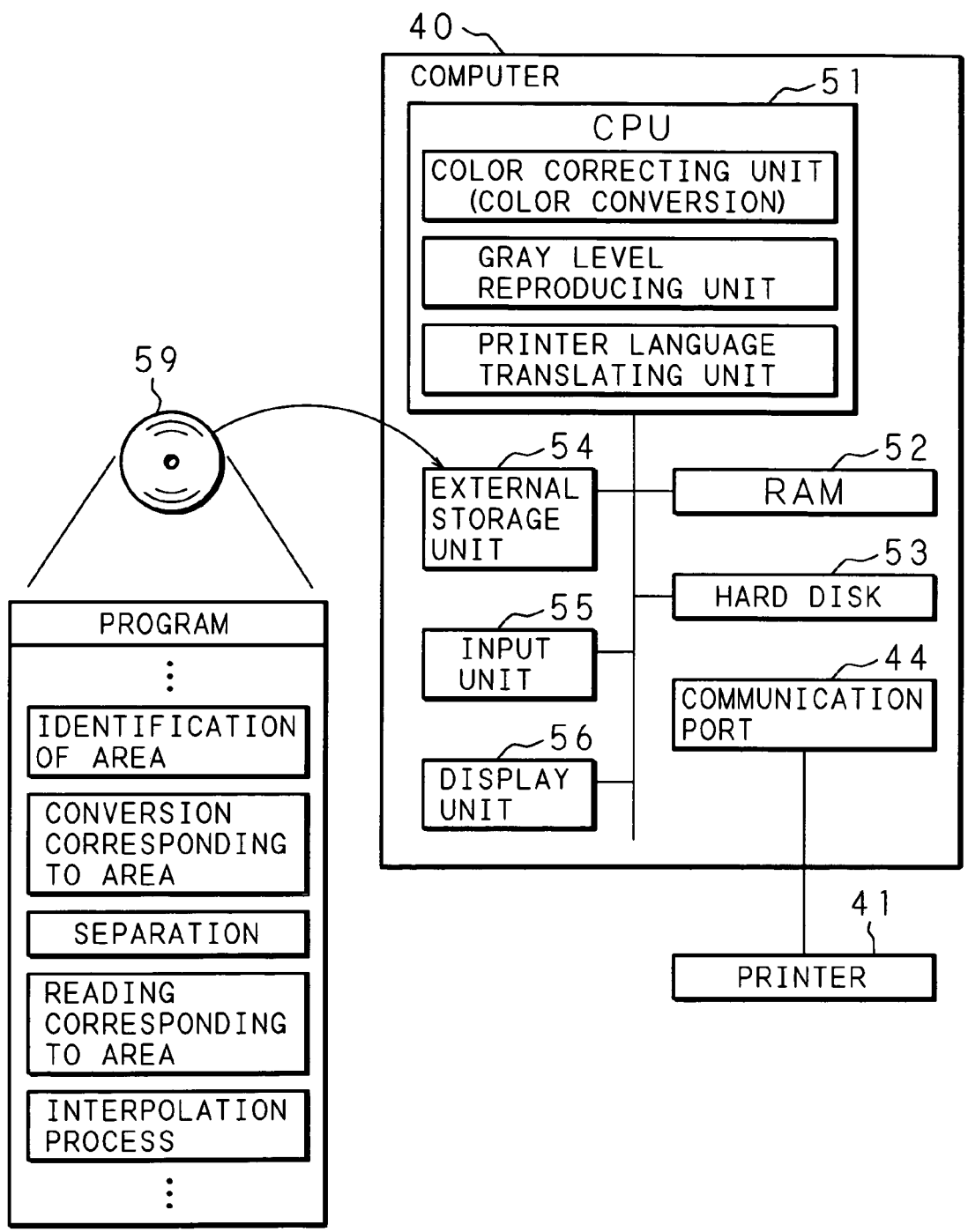
FIG. 13 is a block diagram showing another example of a computer of the image forming system shown in FIG. 6.

FIG. 13 is a block diagram showing another example of the computer 40 of the image forming system 71 shown in Embodiment 4 (FIG. 6), and the structure is the same as that shown in FIG. 7. However, the CPU 51 of the computer 40 of FIG. 13 acts as the data converting unit 12, bit separating unit 14, table access unit 16, and three-dimensional interpolation processing unit 20 of Embodiment 5 (FIGS. 10A and 10B). Moreover, the 1DLUT for use in data conversion by the data converting unit 12 and the 3DLUT 18 used by the table access unit 16 are stored on the hard disk 53. Further, the CPU 51 performs the process of identifying an area, such as a character area, a dot area and a photograph area, that is performed by the segmentation processing unit 314 of the image forming apparatus 70 of Embodiment 6 (FIG. 12).

By reading a computer program recorded on the recording medium 59 such as a CD-ROM by the external storage unit 54, storing the computer program on the hard disk 53 or RAM 52 and executing the program by the CPU 51, it is possible to cause the CPU 51 to act as the above-described respective units. It may also be possible to receive a computer program from other device through the communication port 44 connected to a LAN (Local Area Network), etc. and store it on the hard disk 53 or RAM 52.

Figure 14:
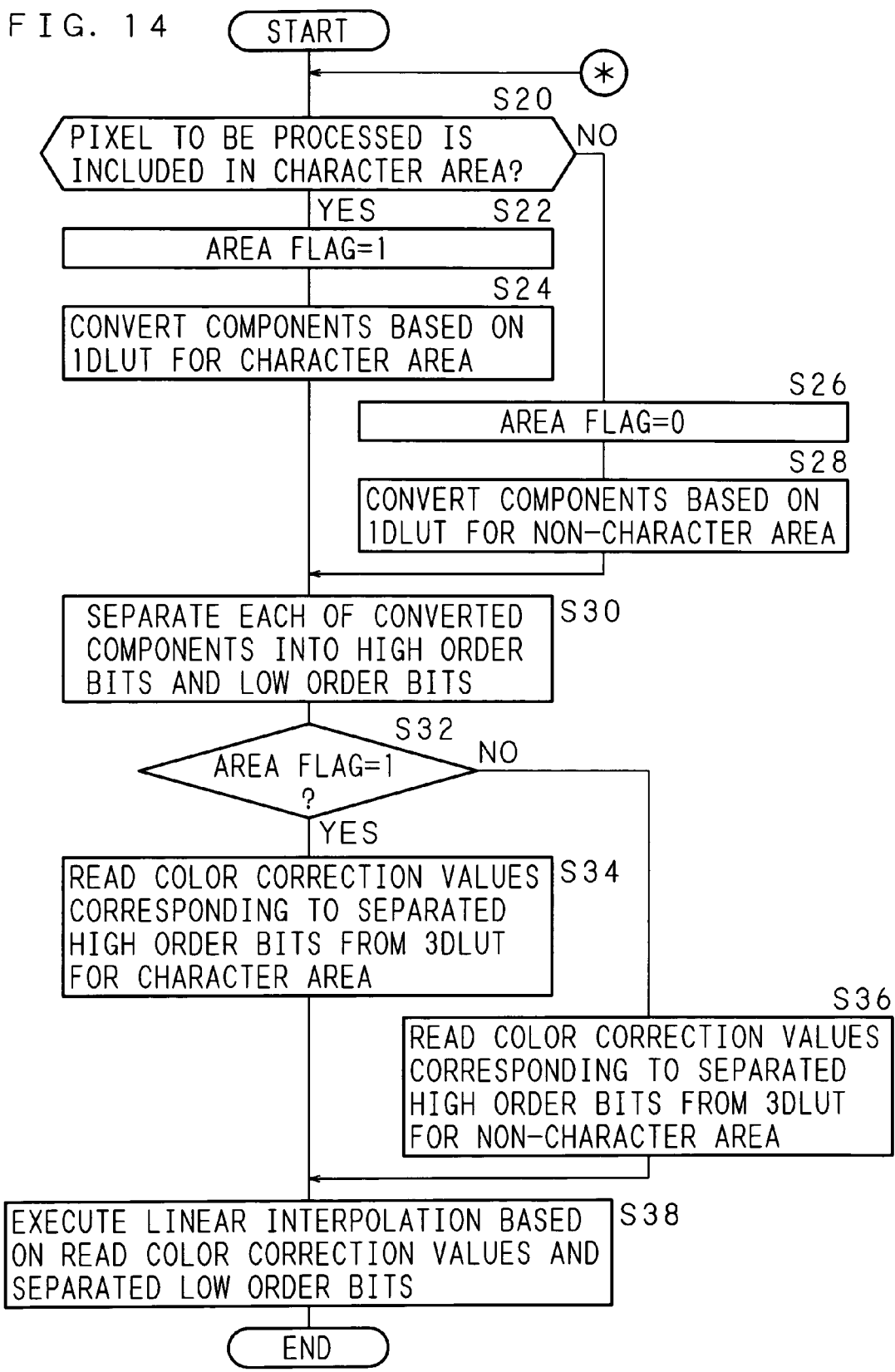
FIG. 14 is a flowchart showing another example of the steps of the process of color conversion from RGB to CMY.

FIG. 14 is a flowchart showing another example of the steps of the process of color conversion from RGB into CMY. The CPU 51 identifies to which area each pixel of the input image data belongs. If the pixel to be processed is included in a character area (S20: YES), the CPU 51 sets an area flag stored in the RAM 52 to "1" (S22), converts the R, G, B components of the input image data, based on the 1DLUT for a character area stored on the hard disk 53 (S24), separates each of the converted components R', B', G' into high order bits and low order bits (S30), and stores them in the RAM 52 or hard disk 53. On the other hand, if the respective color components are not included in a character area (S20: NO), the CPU 51 sets the area flag stored in the RAM 52 to "0" (S26), converts the R, G, B components of the input image data, based on the 1DLUT for a non-character area stored on the hard disk 53 (S28), separates each of the converted components R', B', G' into high order bits and low order bits (S30), and stores them in the RAM 52 or hard disk 53. The conversion and separation are performed in the same manner as in Embodiment 5.

When the area flag is "1" (S32: YES), the CPU 51 reads color correction values corresponding to the separated high order bits from the 3DLUT for a character area stored on the hard disk 53 (S34), or when the area flag is "0" (S32: NO), the CPU 51 reads color correction values from the 3DLUT for a non-character area stored on the hard disk 53 (S36), and then stores the read values in the RAM 52 or hard disk 53 and executes linear interpolation based on the color correction values and the separated low order bits (S38), and finds C, M, Y components and stores them in the RAM 52 or hard disk 53. The reading and linear interpolation are performed in the same manner as in Embodiment 5.

In each of Embodiments 5, 6 and 7 described above, any one 3DLUT is selected as a 3DLUT for storing the color correction values from a plurality of kinds of 3DLUTs corresponding to areas in the input image, such as a character area and a non-character area (areas of pixels to be converted). However, the areas are not limited to the areas in the input image, and it may also be possible to select any one 3DLUT from a plurality of kinds of 3DLUTs corresponding to the whole input image (all pixel areas) of a document such as, for example, a character document and a photograph document.

EMBODIMENT 8

Moreover, it may be possible to prepare a 3DLUT corresponding to the whole input image of a character document, a photograph document, a character-and-photograph document, etc. Further, for a character-and-photograph document, it may be possible to also prepare 3DLUTs corresponding to areas in the input image, such as a character area and a photograph area.

Figure 15A:
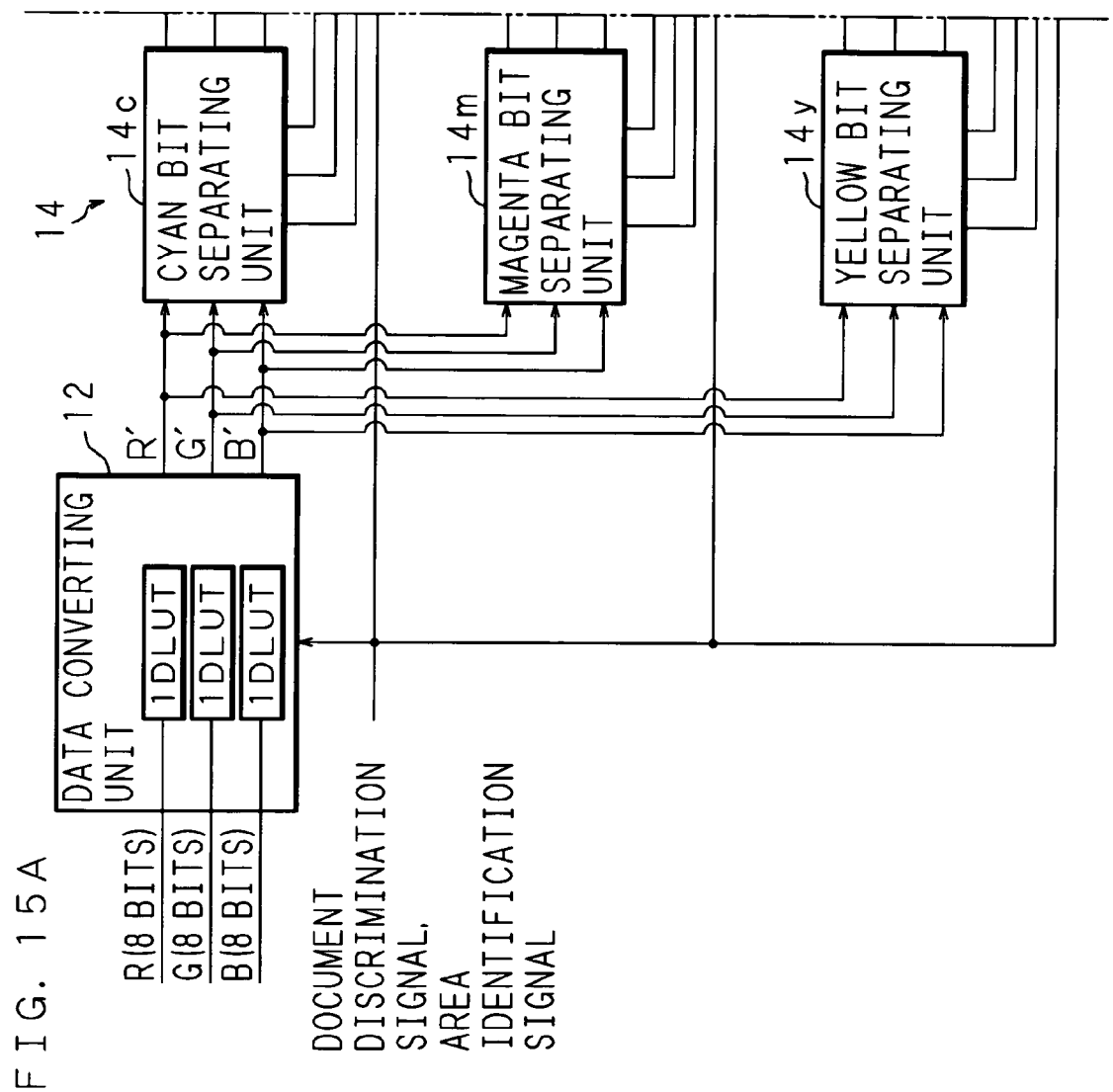
FIGS. 15A and 15B are block diagrams showing another example of a color converting device that selects and uses any one of a plurality of types of 3DLUT.
Figure 15B:
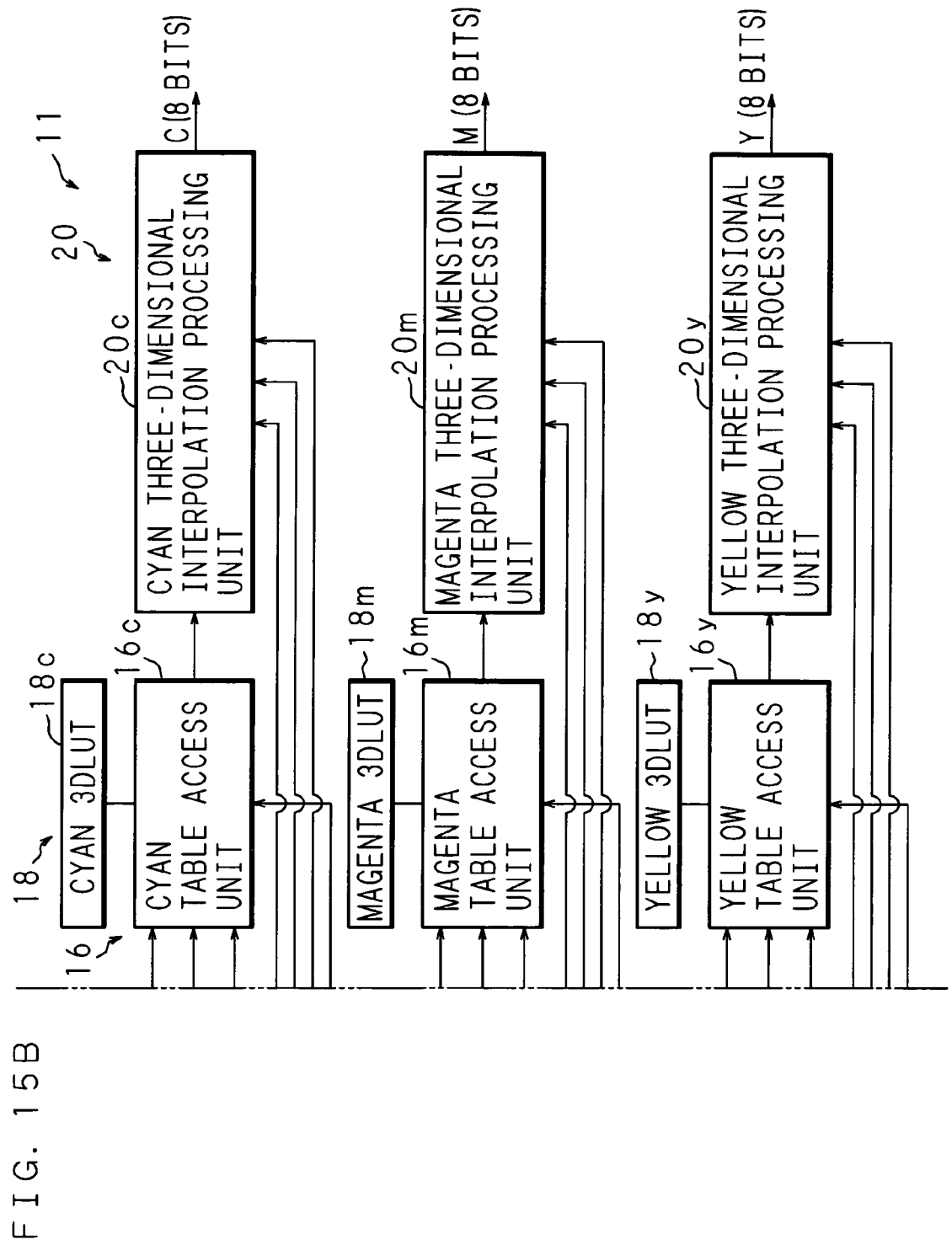
Figure 16A:
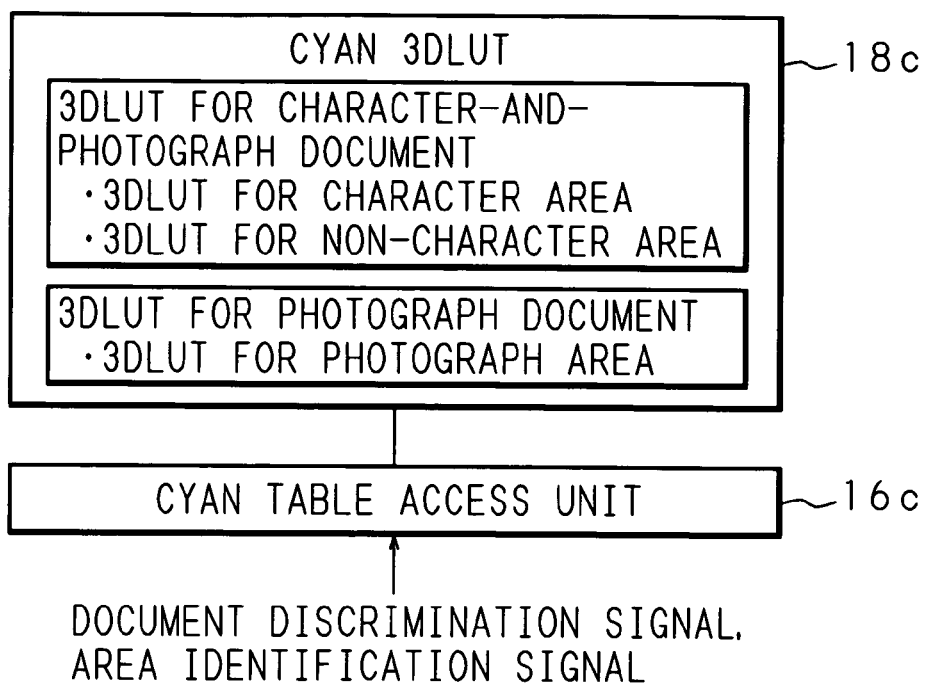
FIGS. 16A and 16B are essential enlarged block diagrams of a cyan table access unit and a cyan 3DLUT portion shown in FIG. 15B.

FIGS. 15A and 15B are block diagrams showing still another example of a color converting device that selects and uses any one of a plurality of kinds of 3DLUTs, and FIG. 15A continues on FIG. 15B. FIG. 16A is an essential enlarged block diagram of the cyan table access unit 16c and the cyan 3DLUT 18c shown in FIG. 15B. The basic structure of the color converting device 11 is the same as that in Embodiment 5 (FIGS. 10A and 10B). However, the 3DLUT 18 includes a plurality of 3DLUTs, and in the example shown in FIG. 16A, the 3DLUT 18 includes a 3DLUT for a character-and-photograph document including a 3DLUT for a character area and a 3DLUT for a non-character area; and a 3DLUT for a photograph document including a 3DLUT for a photograph area. Moreover, a document discrimination signal indicating that the document is a character-and-photograph document or a photograph document, and an area identification signal are inputted to the data converting unit 12 and the table access unit 16, and then a LUT to be used is selected based on the inputted document discrimination signal and area identification signal. Note that similarly to the cyan 3DLUT 18c, the magenta 3DLUT 18m and the yellow 3DLUT 18y include a 3DLUT for a character-and-photograph document and a 3DLUT for a photograph document, and a 3DLUT is selected based on the inputted document discrimination signal and area identification signal.

The 3DLUT for a character-and-photograph document (the 3DLUT for a character area and the 3DLUT for a non-character area) is the same as that in Embodiment 5. In the 3DLUT for a photograph document (a 3DLUT for a photograph area), for example, the grid width is 16, and the number of grid points is 21(R')×21(G')×21(B'). Since a photograph document is often a photographic-paper photograph or a high-definition printed photograph, it is necessary to perform color conversion with higher accuracy compared with a character-and-photograph document, and thus the number of grid points is increased compared with a character-and-photograph document. Moreover, color correction values are set so that color reproduction is performed by attaching greater importance to the gray level compared with a character-and-photograph document.

By increasing the number of grid points in the 3DLUT for a photograph area to 21 from the standard value 17, it is possible to improve the color conversion accuracy. However, when the number of grid points is increased, the data size of the 3DLUT is increased, but it is possible to increase the number of grid points within the memory capacity limit. For example, when the number of grid points is increased to 33×33×33=35937 from the standard 17×17×17=4913, the increased size is 35937−4913=31024. However, in the present invention, when the number of grid points is increased to 21×21×21=9261 from the standard 17×17×17=4913, the increased size is 9261−4913=4348, and thus it is possible to adjust the increased size (number of grid points) according to the memory capacity.

For example, when the document discrimination signal indicates a photograph document, since the 3DLUT for a photograph area in which the number of grid points is 21 that is greater than the standard value 17 is selected, the data converting unit 12 performs conversion using a 1DLUT similar to the 1DLUT used when increasing the grid points shown in FIG. 2A so that output values ranging from 0 to 320 are obtained from input values ranging from 0 to 255. In this case, an output value is 9 bits. On the other hand, for example, when the document discrimination signal indicates a character-and-photograph document, the data converting unit 12 performs conversion according to the area identification signal in the same manner as in Embodiment 5. Note that the 1DLUT for a character area, 1DLUT for a non-character area, 1DLUT for a photograph area, and the corresponding relationship between the document discrimination signal and the area identification signal and the 1DLUT are stored in the data converting unit 12 in advance.

The bit separating unit 14 performs processing similar to that performed in Embodiment 1 (FIGS. 1A and 1B). The table access unit 16 reads color correction values from the 3DLUT 18, based on the high order bits separated by the bit separating unit 14, the document discrimination signal and the area identification signal. For example, when a document discrimination signal indicates a photograph document, the cyan table access unit 16c reads correction values corresponding to the high order bits of R', G', B' from the 3DLUT for a photograph area. On the other hand, for example, when the document discrimination signal indicates a character-and-photograph document and the area identification signal indicates a character area, the cyan table access unit 16c reads color correction values corresponding to the high order bits of R', G', B' from the 3DLUT for a character area. Similarly to the cyan table access unit 16c, the magenta table access unit 16m and the yellow table access unit 16y read color correction values from a 3DLUT corresponding to the document discrimination signal and the area identification signal. Note that the corresponding relationship between a document discrimination signal and an area identification signal and a 3DLUT is stored in the table access unit 16 in advance. The three-dimensional interpolation processing unit 20 performs processing similar to that performed in Embodiment 1 (FIGS. 1A and 1B).

Figure 16B:
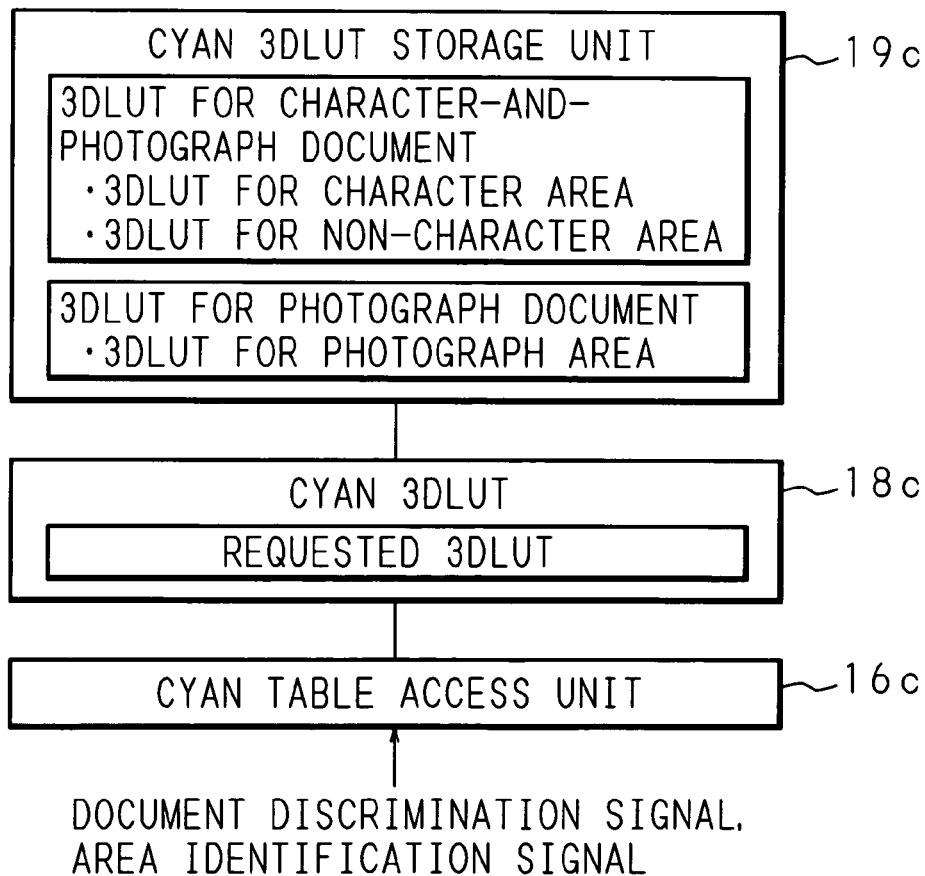

When using a plurality of 3DLUTs, it is possible to store a plurality of 3DLUTs in the 3DLUT storage unit and read a necessary 3DLUT. FIG. 16B is an essential enlarged block diagram of the cyan table access unit 16c and the cyan 3DLUT 18c shown in FIG. 15B. The cyan 3DLUT storage unit 19c storing the 3DLUT for a character-and-photograph document and the 3DLUT for a photograph document are connected to the cyan 3DLUT 18c, and the cyan 3DLUT 18c reads a 3DLUT requested from the cyan table access unit 16c from the cyan 3DLUT storage unit 19c. The cyan 3DLUT storage unit 19c is a ROM or a hard disk, for example, and the cyan 3DLUT 18c is a RAM, for example.

In each of the above-described embodiments, color conversion from RGB (a plurality of first color components) into CMY (a plurality of second color components) is explained as an example, but the plurality of second color components are not limited to CMY, and it may be possible to use, for example, CIE1976L*a*b* signals (CIE is Commission International de l' Eclairage, L* is luminosity, and a* and b* are chromaticity), or XYZ (tristimulus values of the object color by reflection).

EMBODIMENT 9

Figure 17:
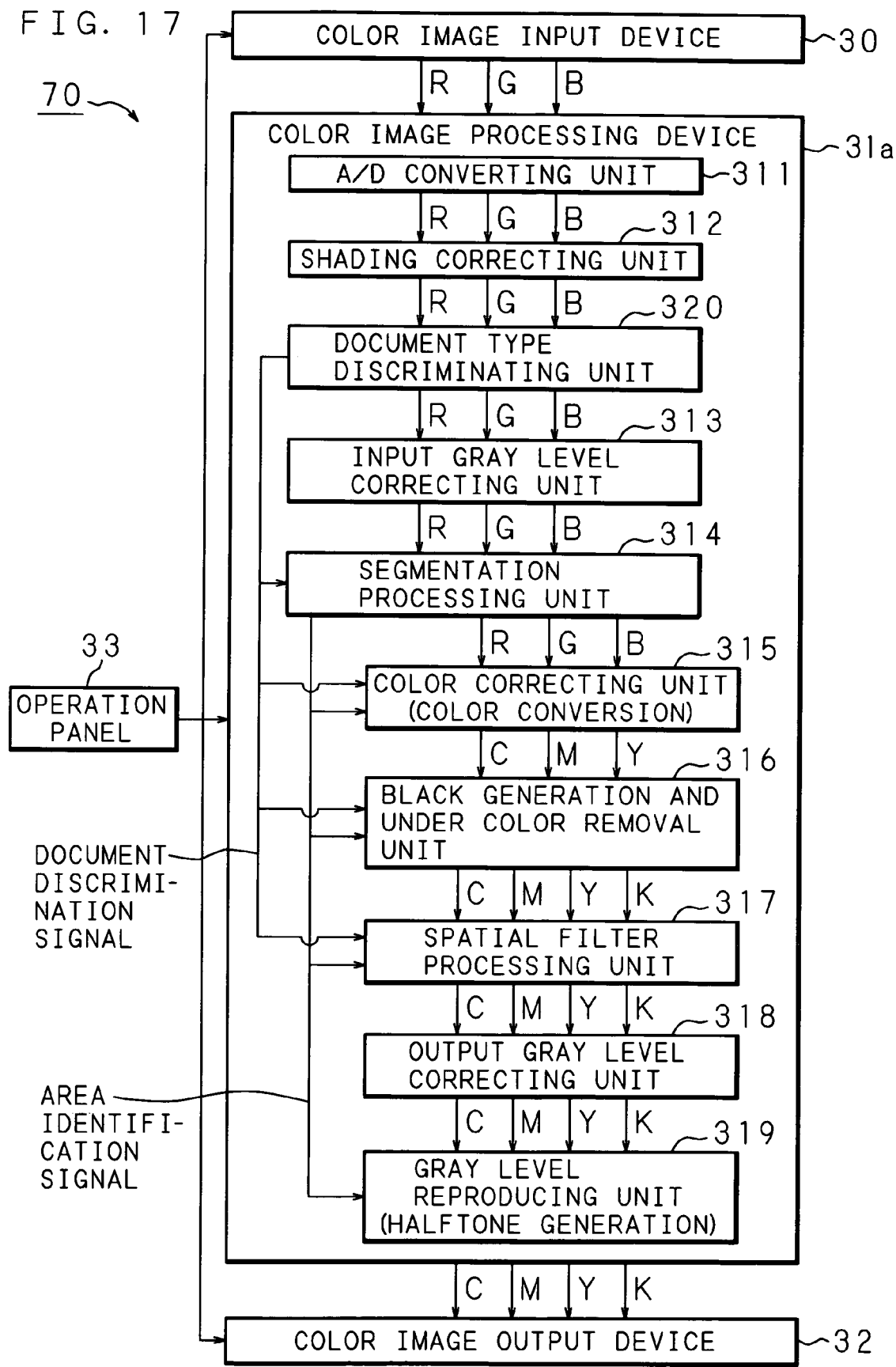
FIG. 17 is a block diagram showing still another example of the structure of an image forming apparatus of the present invention.

FIG. 17 is a block diagram showing still another example of the structure of the image forming apparatus 70 of the present invention. The structure of the image forming apparatus 70 shown in FIG. 17 is almost the same as that shown in Embodiment 6 (FIG. 12). However, a document type discriminating unit 320 is provided between the shading correcting unit 312 and the input gray level correcting unit 313. Moreover, the color correcting unit 315 acts as the above-described color converting device of Embodiment 8 (FIGS. 15A and 15B).

The shading correcting unit 312 performs the process of removing various distortions caused in the illuminating system, imaging system and image capturing system of the color image input device 30 on the digital RGB signals sent from the A/D converting unit 311. Further, the shading correcting unit 312 adjusts color balance.

The document type discriminating unit 320 converts RGB signals (RGB reflectance signals) on which the removal of various distortions and the adjustment of color balance were performed in the shading correcting unit 312 into density signals, etc. that are easily handled by the image processing system employed in a color image processing device 31a, and discriminates a document type by judging whether the input document image is, for example, a character document, a photograph document, or a character-and-photograph document that is a combination of character and photograph documents. The discrimination result (document discrimination signal) is inputted, for example, to the segmentation processing unit 314, color correcting unit 315, black generation and under color removal unit 316 and spatial filter processing unit 317, and appropriate processing is performed according to the discrimination result. Moreover, the input gray level correcting unit 313 performs removal of the ground density and the process of adjusting image quality such as contrast.

The document type discrimination method to be executed by the document type discriminating unit 320 is not limited, and it may be possible to use, for example, a method disclosed in Japanese Patent Application Laid-Open No. 2002-218232. In this method, a low density portion smaller than a predetermined threshold value, a first maximum density portion, and a second maximum density portion with the highest density other than density portions adjacent to the first maximum density portion are found based on a density histogram created by pre-scanning the document image, and the number of low density portions, the ratio of the first maximum value to the total number of pixels, and the ratio of (first maximum value−second maximum value) to the total number of pixels are calculated. By comparing these calculated values with the first threshold value, second threshold value and third threshold value, respectively, the document is classified into any one of a character document, a photograph document and a character-and-photograph (character-photograph) document. Note that in Embodiment 8 described above, a judgment as to whether a document is a character-photograph document or a photograph document is made, and a character-photograph document includes a character document.

When the document is judged as a photograph, the input image data is binarized, a mask composed of a plurality of pixels including a target pixel is set, and the sum of the number of changes from "0" to "1" and changes from "1" to "0" in the main-scanning direction and the sub-scanning direction is calculated (it may be possible to find only the number of changes in the main-scanning direction for high-speed processing). If the sum is not less than a predetermined threshold value, it is possible to judge that the document is a printed photograph (because the change of the image signal in a local area is large in a printed photograph), whereas if the sum is less than the predetermined threshold value, it is possible to judge that the document is a photographic-paper photograph. Thus, it is possible to further classify photograph documents into a printed-photograph document and a photographic-paper photograph document.

In addition, the document discriminating unit 320 comprises a storage unit for storing the discrimination results of document type, and compares a discrimination result with the previous discrimination result stored in the storage unit. The storage unit may be able to retain the discrimination results using a flash memory, for example, even when the power is turned off.

EMBODIMENT 10

Figure 18:
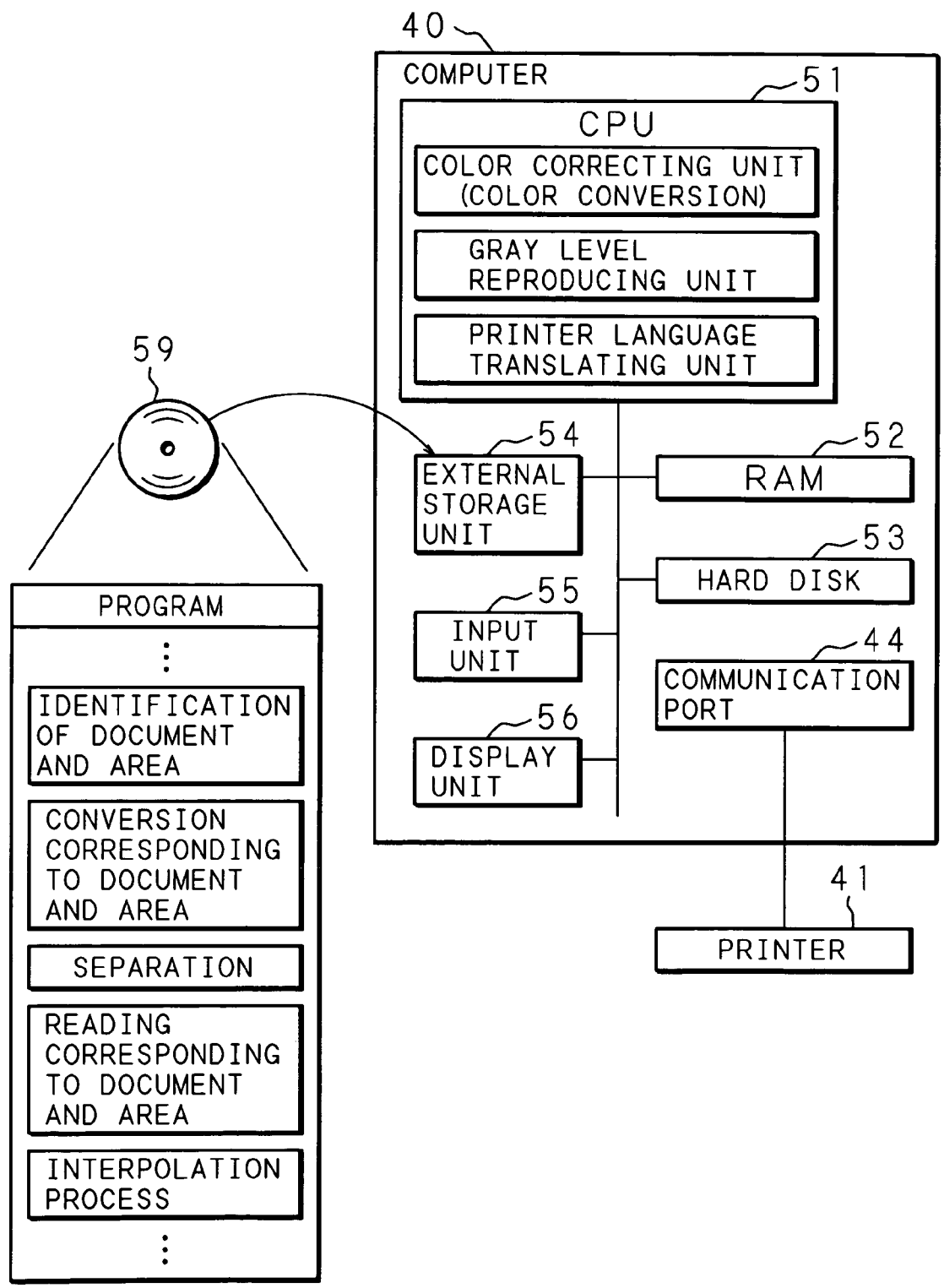
FIG. 18 is a block diagram showing still another example of a computer of the image forming system shown in FIG. 6.

FIG. 18 is a block diagram showing still another example of the computer 40 of the image forming system 71 shown in Embodiment 4 (FIG. 6), and the structure is the same as that in FIG. 7. However, the CPU 51 of the computer 40 of FIG. 18 acts as the data converting unit 12, bit separating unit 14, table access unit 16, and three-dimensional interpolation processing unit 20 of Embodiment 8 (FIGS. 15A and 15B). Besides, the 1LDUT for use in data conversion by the data converting unit 12 and the 3DLUT 18 used by the table access unit 16 are stored on the hard disk 53. Further, the CPU 51 performs discrimination of the type of a document such as a character document, a photograph document, and a character-and-photograph document, which is performed by the document discriminating unit 32 of the image forming apparatus 70 in Embodiment 9 (FIG. 17), and identification of an area such as a character area, a dot area and a photograph area, which is performed by the segmentation processing unit 314.

By reading a computer program recorded on the recording medium 59 such as a CD-ROM by the external storage unit 54, storing the computer program on the hard disk 53 or RAM 52 and executing the program by the CPU 51, it is possible to cause the CPU 51 to act as the above-described respective units. It may also be possible to receive a computer program from other device through the communication port 44 connected to a LAN (Local Area Network), etc. and store it on the hard disk 53 or RAM 52.

Figure 19:
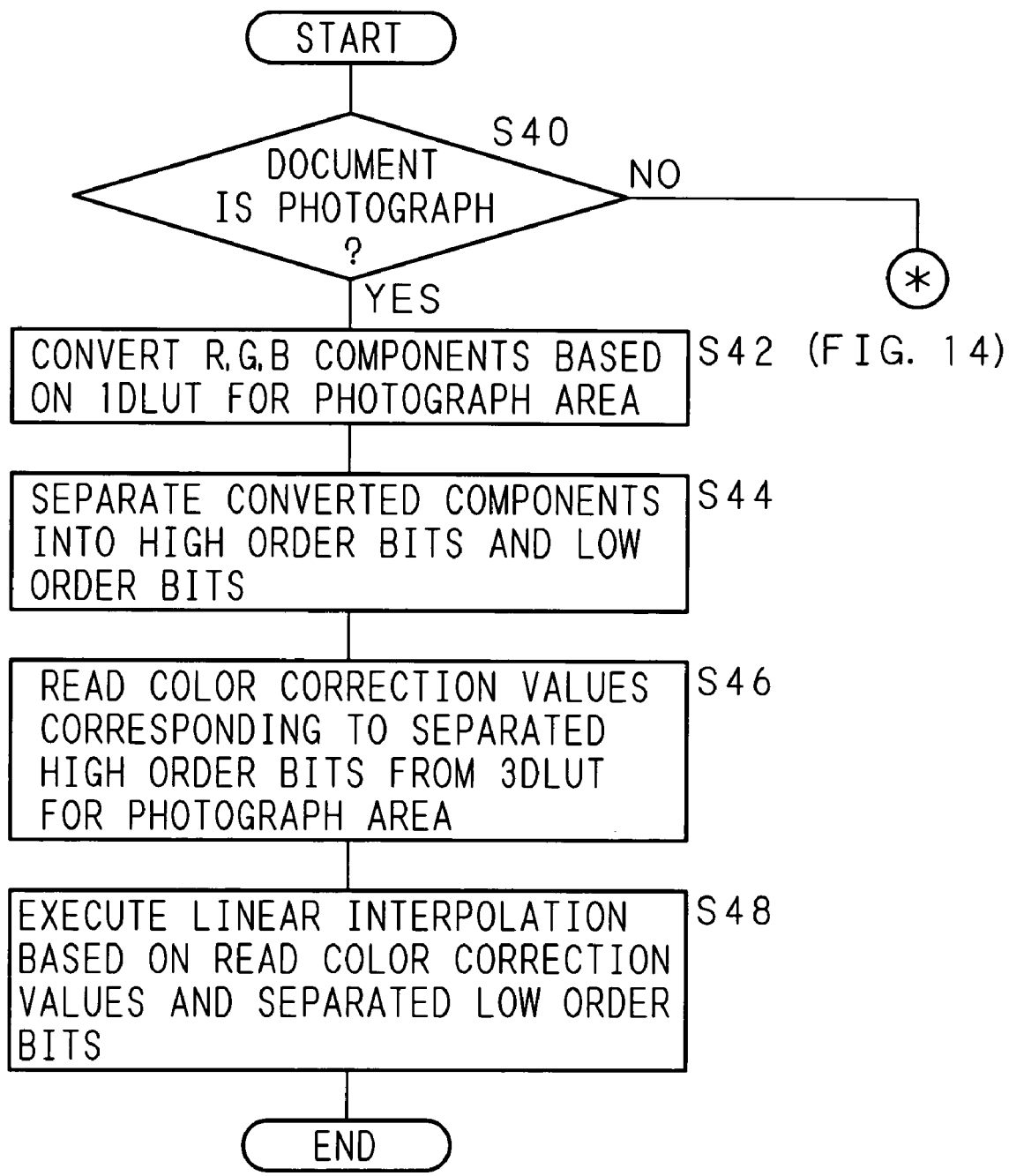
FIG. 19 is a flowchart showing still another example of the steps of the process of color conversion from RGB to CMY.

FIG. 19 is a flowchart showing still another example of the steps of the process of color conversion from RGB to CMY. The CPU 51 performs the document type discrimination process, and if a document is not a photograph document (S40: NO), the CPU 51 performs the same processing as in FIG. 14. If the document is a photograph document (S40: YES), the CPU 51 converts the R, G, and B components of the input image data, based on the 1DLUT for a photograph area stored on the hard disk 53 (S42), separates each of the converted R', G', and B' components into high order bits and low order bits (S44), and stores them in the RAM 52 or the hard disk 53. The conversion and separation are performed in the same manner as in Embodiment 8 (FIGS. 15A and 15B).

The CPU 51 reads color correction values corresponding to the separated high order bits from the 3DLUT for a photograph area stored on the hard disk 53 (S46), stores the read values in the RAM 52 or the hard disk 53, executes linear interpolation based on the color correction values and the separated low order bits (S48), and finds C, M, and Y components and stores them in the RAM 52 or hard disk 53. The reading and linear interpolation are performed in the same manner as in Embodiment 8 (FIGS. 15A and 15B).

Here, the document type is not limited to a type of an image based on a document read by an image scanner, and, for example, it may be a type of an image based on document data or image data received from a computer, or a type of an image based on data received from an external device by facsimile. Besides, it may be possible to allow the user to input a document type from the operating panel 33 of the image forming apparatus 70 or the like.

As described in Embodiments 4, 7 and 10 above, the present invention can record a color conversion method of the present invention on a computer-readable recording medium storing a program to be executed by a computer. As a result, it is possible to provide a portable recording medium storing the program for executing the color conversion method.

In this embodiment, the recording medium may be a memory such as a ROM, for example, for causing a computer to perform processing, or a recording medium that is inserted into and read by a program reader provided as an external memory device. In either case, it is possible to cause a microprocessor (CPU) to access and execute the program, or it is possible to install the program and execute the installed program. Note that a program for installation may be stored in the main body of the apparatus in advance, or a program for installation may be provided separately.

Here, the above-mentioned recording medium is a recording medium that is removable from the main body, and may be a medium carrying a program, for example, a tape type recording medium such as a magnetic tape and a cassette tape; a magnetic disk type recording medium such as a flexible disk and a hard disk; an optical disk type recording medium such as a CD-ROM, MO, MD, and DVD; a card type recording medium such as an IC card (including a memory card) and an optical card; semiconductor memory such as a mask ROM, EPROM (Erasable Programmable Read Only Memory), EEPROM (Electrically Erasable Programmable Read Only Memory), and flash ROM.

Moreover, in this embodiment, since the system is connectable to communication networks including the Internet, the recording medium may be a medium carrying a program in a flowing manner as in the case of downloading a program from a communication network. When downloading the program from a communication network, a program for download is stored in the main body of the apparatus in advance, or installed from a different recording medium.

When the recording medium is read by a program reader provided in a digital color image forming apparatus or a computer, the above-mentioned color conversion method is executed.

In addition, the color converting device and the color conversion method of the present invention may also be applicable to an embodiment in which an image input device such as a scanner or a digital camera is directly connected to a printer without passing through a computer. In this case, a program for implementing the color converting device or the color conversion process is introduced into an image input device such as a scanner or a digital camera, and color conversion according to the present invention is performed on RGB signals read by the image input device and then the resulting signals is outputted. For example, if a scanner is used in the structure of FIG. 5, it may be possible to construct the color converting device and the color conversion method by the image input device and the image processing device composed of the A/D converting unit, shading correcting unit, input gray level correcting unit and the color correcting unit. Alternatively, instead of introducing the program for implementing the color converting device or the color conversion process into an image input device, the program may be introduced into a printer together with the gray level reproducing unit.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A color converting device for converting input image data based on a plurality of first color components into output image data based on a plurality of second color components, comprising:

a first data converting unit for converting each color component of input image data, according to the number of grid points obtained by dividing a color space composed of the plurality of first color components; and a second data converting unit for converting the input image data into output image data by performing interpolation processing using color correction values at the grid points corresponding to the color components converted by the first data converting unit, wherein a distance of the grid points is uniform, and the number of grid points is determined for each color component, wherein the first data converting unit converts a color component of input image data into a color component whose maximum value is represented by (the distance of the grid points×(the number of grid points−1)−1), and wherein when the number of grid points is greater than $2^m+1$, where $m=k-n$, n is an integer smaller than the number k of bits of each color component of the input image data, the first data converting unit converts a color component of input image data into a color component of k+1 bits.

2. The color converting device according to claim 1, wherein when the number of grid points is smaller than $2^m+1$, where $m=k-n$, n is an integer smaller than the number k of bits of each color component of the input image data, the first data converting unit converts a color component of input image data into a color component of k bits.

3. An image forming apparatus comprising:

a color converting device defined in claim 1; and an image forming unit for forming an image on a sheet based on image data on which color conversion was performed by the color converting device.

4. A color converting device for converting input image data based on a plurality of first color components into output image data based on a plurality of second color components, comprising:

a first data converting unit for converting each color component of input image data, according to the number of grid points obtained by dividing a color space composed of the plurality of first color components; and a second data converting unit for converting the input image data into output image data by performing interpolation processing using color correction values at the grid points corresponding to the color components converted by the first data converting unit, wherein a distance of the grid points is $2^n$, where n is an integer smaller than the number k of bits of each color component of the input image data, and the number Dn of grid points is an integer satisfying $$2^{m-1}+1 < Dn < 2^m+1, \text{ or } 2^m+1 < Dn < 2^{m+1}+1,$$
where $m = k-n$, wherein the first data converting unit converts a color component of input image data into a color component whose maximum value is represented by (the distance of the grid points×(the number of grid points−1)−1), and wherein when the number of grid points is greater than $2^m+1$, where m=k−n, the first data converting unit converts a color component of input image data into a color component of k+1 bits.

5. The color converting device according to claim 4, wherein when the number of grid points is smaller than $2^m+1$, where m=k−n, the first data converting unit converts a color component of input image data into a color component of k bits.

6. The color converting device according to claim 4, wherein the number of grid points of at least one color component of the first color components differs from the number of grid points of the other color components.

7. An image forming apparatus comprising:

a color converting device defined in claim 4; and an image forming unit for forming an image on a sheet based on image data on which color conversion was performed by the color converting device.

* * * * *